United States Patent
Radigan et al.

(10) Patent No.: US 10,747,511 B2
(45) Date of Patent: Aug. 18, 2020

(54) COMPILER OPTIMIZATION OF COROUTINES

(71) Applicant: Microsoft Technology Licensing, LLC, Redmond, WA (US)

(72) Inventors: James J. Radigan, Sammamish, WA (US); Gor Nishanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 873 days.

(21) Appl. No.: 14/751,262

(22) Filed: Jun. 26, 2015

(65) Prior Publication Data
US 2016/0321045 A1 Nov. 3, 2016

Related U.S. Application Data

(60) Provisional application No. 62/153,556, filed on Apr. 28, 2015.

(51) Int. Cl.
*G06F 8/41* (2018.01)
*G06F 9/448* (2018.01)

(52) U.S. Cl.
CPC ............ *G06F 8/443* (2013.01); *G06F 8/4434* (2013.01); *G06F 8/47* (2013.01); *G06F 9/4484* (2018.02)

(58) Field of Classification Search
CPC .. G06F 7/78; G06F 8/00–78; G06F 9/44–455; G06F 11/36
See application file for complete search history.

(56) References Cited

U.S. PATENT DOCUMENTS

| | | | |
|---|---|---|---|
| 6,016,398 | A | 1/2000 | Radigan |
| 6,031,994 | A | 2/2000 | Radigan |
| 6,151,704 | A | 11/2000 | Radigan |
| 6,247,174 | B1 | 6/2001 | Santhanam et al. |
| 7,426,725 | B2 | 9/2008 | Moon et al. |
| 7,512,738 | B2 | 3/2009 | Balakrishnan et al. |
| 7,539,983 | B2 | 5/2009 | Bearman et al. |
| 7,558,935 | B1 | 7/2009 | Boucher et al. |

(Continued)

FOREIGN PATENT DOCUMENTS

WO    2011139722 A2    11/2011

OTHER PUBLICATIONS

Paulo Zemek, "Async/Await Could Be Better", retrieved from <<http://www.codeproject.com/Articles/357724/Async-Await-Could-Be-Better%23update>>, Apr. 11, 2012, 11 pages.

(Continued)

*Primary Examiner* — Brian W Wathen
(74) *Attorney, Agent, or Firm* — Ogilvie Law Firm

(57) ABSTRACT

As a memory usage optimization, a compiler identifies coroutines whose activation frames can be allocated on a caller's stack instead of allocating the frame on the heap. For example, when the compiler determines that a coroutine C's life cannot extend beyond the life of the routine R that first calls the coroutine C, the compiler generates code to allocate the activation frame for C on the stack of R, instead of generating code to allocate C's frame from heap memory. In some cases, as another optimization, code for coroutine C is also inlined with code for the routine R that calls C. Coroutine activation frame content variations and layout variations are also described.

20 Claims, 8 Drawing Sheets

(56) References Cited

U.S. PATENT DOCUMENTS

| | | | |
|---|---|---|---|
| 7,577,992 | B2 | 8/2009 | Abadi et al. |
| 7,631,304 | B2 | 12/2009 | Bearman et al. |
| 7,757,097 | B2 | 7/2010 | Atallah et al. |
| 8,051,426 | B2 | 11/2011 | Meijer et al. |
| 8,291,393 | B2 | 10/2012 | Gallop et al. |
| 8,756,572 | B2 | 6/2014 | Halliday et al. |
| 2001/0011371 | A1* | 8/2001 | Tang ............... G06F 8/41 717/160 |
| 2004/0015920 | A1* | 1/2004 | Schmidt ........... G06F 9/443 717/153 |
| 2005/0097528 | A1 | 5/2005 | Chakrabarti et al. |
| 2007/0157178 | A1 | 7/2007 | Kogan et al. |
| 2007/0266316 | A1* | 11/2007 | Butlin ............... G06F 8/38 715/700 |
| 2008/0127303 | A1 | 5/2008 | Wrighton et al. |
| 2009/0055814 | A1 | 2/2009 | Gallop et al. |
| 2009/0083699 | A1* | 3/2009 | Santhanam ....... G06F 8/436 717/107 |
| 2009/0144309 | A1* | 6/2009 | Cabrera Escandell ............ G06F 21/54 |
| 2009/0282393 | A1 | 11/2009 | Costa et al. |
| 2011/0138373 | A1* | 6/2011 | Lane ............... G06F 8/443 717/157 |
| 2011/0167248 | A1 | 7/2011 | Gafter et al. |
| 2012/0047495 | A1 | 2/2012 | Meijer et al. |
| 2012/0265946 | A1* | 10/2012 | Branton ........... G06F 9/44521 711/154 |
| 2013/0024676 | A1 | 1/2013 | Glew et al. |
| 2013/0132465 | A1* | 5/2013 | Brown ............. A61M 1/10 709/203 |
| 2014/0068068 | A1 | 3/2014 | Bansal et al. |
| 2015/0095578 | A1* | 4/2015 | Doshi ............. G06F 12/0888 711/125 |

OTHER PUBLICATIONS

Gor Nishanov, "Await 2.0 Stackless Resumable Functions", retrieved from <<https://github.com/CppCon/CppCon2014/blob/master/Presentations/await%202.0%20-%20Stackless%20Resumable%20Functions/await%202.0%20-%20Stackless%20Resumable%20Functions%20-%20Gor%20Nishanov%20-%20CppCon%202014.pdf>>, Sep. 7, 2014, 58 pages.

Oliver Kowalke, "Chapter 1. Coroutine", retrieved from <<http://www.boost.org/doc/libs/1_57_0/libs/coroutine/doc/html/index.html>>, 2009, 18 pages.

"How do you implement Coroutines in C++", retrieved from <<http://stackoverflow.com/questions/121757/how-do-you-implement-coroutines-in-c>>, Sep. 23, 2008, 4 pages.

Giovanni P. Deretta, "Implementation", retrieved from <<http://www.crystalclearsoftware.com/soc/coroutine/coroutine/implementation.html>>, 2006, 3 pages.

Gor Nishanov, Jim Radigan, "Document No. N4134: Resumable Functions v.2", retrieved from <<http://www.open-std.org/jtc1/sc22/wg21/docs/papers/2014/n4134.pdf>>, Oct. 10, 2014, 29 pages.

Nat Goodspeed, "Stackful Coroutines and Stackless Resumable Functions", retrieved from <<http://www.open-std.org/jtc1/sc22/wg21/docs/papers/2014/n4232.pdf>>, Oct. 13, 2014, 8 pages.

Oliver Kowalke, "A unified syntax for stackless and stackful coroutines", retrieved from <<http://open-std.org/JTC1/SC22/WG21/docs/papers/2015/n4398.pdf>>, Apr. 9, 2015, 8 pages.

Jim Hogg, "Optimizing C++ Code : Overview", retrieved from <<http://blogs.msdn.com/b/vcblog/archive/2013/06/12/optimizing-c-code-new-title.aspx>>, Jun. 12, 2013, 4 pages.

"Protothreads—Lightweight, Stackless Threads in C", retrieved from <<http://dunkels.com/adam/pt/>>, no later than Apr. 13, 2015, 2 pages.

"CppCon 2014: Gor Nishanov 'await 2.0: Stackless Resumable Functions' : cpp", retrieved from <<http://www.reddit.com/r/cpp/comments/2k5fet/cppcon_2014_gor_nishanov_await_20_stac>>, Oct. 23, 2014, 4 pages.

Raman Sharma, "Resumable functions in C++", retrieved from <<http://blogs.msdn.com/b/vcblog/archive/2014/11/12/resumable-functions-in-c.aspx>>, Nov. 12, 2014, 6 pages.

Paolo Severini, "Stackless coroutines with Visual Studio 2015", retrieved from <<https://paoloseverini.wordpress.com/2015/03/06/stackless-coroutines-with-vs2015/>>, Mar. 6, 2015, 12 pages.

"Static single assignment form", retrieved from <<http://en.wikipedia.org/wiki/Static_single_assignment_form>>, Mar. 24, 2015, 11 pages.

Sriram Srinivasan, "A Thread of One's Own", retrieved from <<http://www.malhar.net/sriram/kilim/thread_of_ones_own_pdf>>, 2006, 11 pages.

"Use-define chain", retrieved from <<http://en.wikipedia.org/wiki/Use-define_chain>>, Dec. 14, 2014, 5 pages.

Jim Hogg, "Visual Studio 2015 Preview: Work-in-Progress Security Feature", retrieved from <<http://blogs.msdn.com/b/vcblog/archive/2014/12/08/visual-studio-2015-preview-work-in-p . . . >>, Dec. 8, 2014, 4 pages.

"How do stackless coroutines differ from stackful coroutines?", retrieved from <<http://stackoverflow.com/questions/28977302/how-do-stackless-coroutines-differ-from-stackful-coroutines>>, Mar. 11, 2015, 4 pages.

"International Search Report and Written Opinion Issued in PCT Application No. PCT/US2016/027645", dated Jun. 7, 2016, 14 Pages.

Kearns, et al., "The Implementation of Retention in a Coroutine Environment", In Journal Acta Informatica, vol. 19, Issue 3, Jul. 1, 1983, pp. 221-233.

"Second Written Opinion Issued in PCT Application No. PCT/US2016/027645", dated Oct. 13, 2016, 6 Pages.

"International Preliminary Report on Patentability Issued in PCT Application No. PCT/US2016/027645", dated Jan. 20, 2017, 8 Pages.

* cited by examiner

```
BLOCK -1
PRAGMA          OPINLINE
ENTRY           main ()                                                    #90
PRAGMA              OPBLKSTART  <NULL>
PRAGMA              OPBLKSTART  <NULL>
    t65         = OPARG       35(0x23)                    (4|4=4)          #91
    t66         = OPARG       &$S1$1                      (8|8=8)          #91
    t64         = OPCALL      "__cdecl fib(int)", t66, t65 (8|8=8,8,4) #91              //becomes Fib$init()
                  OPPUSHSTATE 0x11 t64                    (8|N=8)          #91
    <range>$L0$2 = OPASSIGN &$S1$1                        (8|8=8)          #91
PRAGMA              OPBLKSTART  <NULL>
    t70         = OPARG       &<begin>$L0$3               (8|8=8)          #91
    t68         = OPARG       <range>$L0$2                (8|8=8)          #91
                  OPCALL      "__cdecl generator::begin()", t68, t70   #91              // becomes Fib$resume()
    t72         = OPARG       &<end>$L0$4                 (8|8=8)          #91
    t69         = OPARG       <range>$L0$2                (8|8=8)          #91
                  OPCALL      "__cdecl generator::end()", t69, t72     #91
                  OPGOTO      &$LN4                       (?|N=0)          #91
$LN2@main:                                                ; uses = 1
    t71         = OPARG       &<begin>$L0$3               (8|8=8)          #91
                  OPCALL      "__cdecl generator::iterator::operator++()", t71 #91    //becomes Fib$resume()
$LN4@main:                                                ; uses = 1
    t75         = OPARG       &<end>$L0$4                 (8|8=8)          #91
    t73         = OPARG       &<begin>$L0$3               (8|8=8)          #91
    t74         = OPCALL      "bool __cdecl generator::iterator::operator!=(l,r)", t73,t75 #91 //is _fp null?
    t76         = OPCONVERT   t74                         (4|4=1)          #91
    t77         = OPCMP       t76, 0(0x0)                 (4|0=4,4)        #91
                  OPBRANCH(EQ) &$LN3, t77                 (?|N=0,0)        #91
PRAGMA              OPBLKSTART  <NULL>
    t78         = OPARG       &<begin>$L0$3               (8|8=8)          #91
    t79         = OPCALL      "int _cdecl generator::iterator::operator*()", t78 #91 // get ret value in frame
    v$5         = OPASSIGN    [t79]                       (4|4=4,8)        #91
PRAGMA              OPBLKSTART  <NULL>
PRAGMA              OPBLKSTART  <NULL>
    t80         = OPCMP       v$5, 10(0xa)                (4|0=4,4)        #93
                  OPBRANCH(LE) &$LN5, t80                 (?|N=0,0)        #93
PRAGMA              OPBLKSTART  <NULL>
                  OPGOTO      &$LN3                       (?|N=0)          #94
PRAGMA              OPBLKEND    <NULL>                                     #95
$LN5@main:                                                ; uses = 1
PRAGMA              OPBLKEND    <NULL>                                     #95
    t82         = OPARG       v$5                         (4|4=4)          #95
    t83         = OPARG       &"string literal main"                       #95
                  OPCALL      &printf, t83, t82           (4|N=8,8,4)      #95
PRAGMA              OPBLKEND    <NULL>                                     #96
PRAGMA              OPBLKEND    <NULL>                                     #96
                  OPGOTO      &$LN2                       (?|N=0)          #96
$LN3@main:                                                ; uses = 2
PRAGMA              OPBLKEND    <NULL>                                     #96
                  OPDTORACTION 0x31 (Count 1)             (4|N=N)          #96
PRAGMA              OPBLKEND    <NULL>                                     #96
                  OPGOTO      &$LN1                       (?|N=0)          #97
PRAGMA              OPBLKEND    <NULL>                                     #97
$LN1@main:                                                ; uses = 1
EXIT                                                                       #97
BLOCK
```

Fig. 5

```
BLOCK -1
PRAGMA           OPINLINE
ENTRY            ?fib$init (__$ReturnUdt$, $<n>$, useStack)  #78
PRAGMA           OPBLKSTART  <NULL>
                 OPKILLREGS                                  (4|N=N)
 t65           = OPINTRINSIC(IV_RESUMABLE_RESUME_ADDR)        (8|8=N)        #88
 t66           = OPARG       t65                              (8|8=8)        #88
 t67           = OPINTRINSIC(IV_RESUMABLE_FRAME_SIZE)         (8|8=N)        #88
 t68           = OPARG       t67                              (8|8=8)        #88
 t13           = OPARG       useStack                         (8|8=8)        #88
 t64           = OPCALL  "generator<int,class std::allocator<char> >,int>::_Alloc()" t68, t66 t13
 t69           = OPARG       t64                              (8|8=8)        #88
                 OPINTRINSIC(IV_RESUMABLE_INIT_FRAME) t69     (0|N=8)        #88
                 OPKILLREGS                                   (4|N=N)
PRAGMA           OPBLKSTART  <NULL>
 n$1           = OPASSIGN    $<n>$                            (4|4=4)        #88
                 OPINTRINSIC(IV_RESUMABLE_DESTROY_FORMALS)    (0|N=N)        #88
                 OPKILLREGS                                   (4|N=N)
PRAGMA           OPBLKSTART  <NULL>
 t73           = OPARG       __$ReturnUdt$                    (8|8=8)        #88
 t74           = OPARG       8(0x8)                           (8|8=8)        #88
 t70           = OPCALL      &??2@YAPEAX_KPEAX@Z, t74, t73    (8|8=8,8,8)    #88
 $T2           = OPASSIGN    t70                              (8|8=8)        #88
                 OPPUSHSTATE 0x2 $T2                          (8|N=8)        #88
 t79           = OPCMP       $T2, 0(0x0)                      (8|0=8,8)      #88
                 OPBRANCH(EQ) &$LN8, t79                      (?|N=0,0)      #88
 t83           = OPINTRINSIC(IV_RESUMABLE_FRAME_PTR)          (8|8=N)        #88
 t84           = OPARG       t83                              (8|8=8)        #88
 t82           = OPCALL"generator<int,class std::allocator<char>>,int>::_Create_return_object()", t84 #88
 t85           = OPARG       t82                              (8|8=8)        #88
 t80           = OPARG       $T2                              (8|8=8)        #88
 t81           = OPCALL  "generator<int,class std::allocator<char>>int>::generator", t80, t85 #88
 tv86          = OPASSIGN    t81                              (8|8=8)        #88
                 OPGOTO      &$LN9                            (?|N=0)        #88
$LN8@fib$init:                                                ; uses = 1
 tv86          = OPASSIGN    0(0x0)                           (8|8=8)        #88
$LN9@fib$init:                                                ; uses = 1
 $T3           = OPASSIGN    tv86                             (8|8=8)        #88
                 OPPOPSTATE  0x22 (Count 1)                   (4|N=N)        #88
PRAGMA           OPBLKEND    <NULL>
PRAGMA           OPBLKSTART  <NULL>
 t87           = OPINTRINSIC(IV_RESUMABLE_FRAME_PTR)          (8|8=N)        #88
 t88           = OPARG       t87                              (8|8=8)        #88
 t78           = OPCALL  "_Resumable_helper_traits< ... >::_Initial_suspend()", t88 (1|1=8,8) #88
 $T4           = OPMBASSIGN  t78                              (1|1=1)        #88
 $T5           = OPMBASSIGN  $T4                              (1|1=1)        #88
 t89           = OPARG       &$T5                             (8|8=8)        #88
 t90           = OPCALL      "::suspend_always::await_ready()" , t89 (1|1=8,8) #88
 t134          = OPCONVERT   t90                              (4|4=1)        #88
 t135          = OPCMP       t134, 0(0x0)                     (4|0=4,4)      #88
                 OPBRANCH(EQ) &$LN10, t135                    (?|N=0,0)      #88
 tv136         = OPASSIGN    0(0x0)                           (4|4=4)        #88
                 OPGOTO      &$LN11                           (?|N=0)        #88
$LN10@fib$init:                                               ; uses = 1
                 OPINTRINSIC(IV_RESUMABLE_SAVE)               (0|N=N)        #88
 t128          = OPINTRINSIC(IV_RESUMABLE_FRAME_PTR)          (8|8=N)        #88
```

Fig. 6

```
t129        = OPARG       t128                              (8|8=8)     #88
t130        = OPARG       &$T6                              (8|8=8)     #88
t95         = OPCALL      "_Resumable_helper_traits< … >::_Handle_from_frame()", t130, t129 #88
t132        = OPMBASSIGN  [t95]                             (8|8=8,8)   #88
$T7         = OPMBASSIGN  t132                              (8|8=8)     #88
t133        = OPMBARG     $T7                               (8|8=8)     #88
t91         = OPARG       &$T5                              (8|8=8)     #88
              OPCALL      "::suspend_always::await_suspend()", t91, t133 #88
              OPINTRINSIC(IV_RESUMABLE_SUSPEND)              (0|N=N)     #88
tv136       = OPASSIGN    0(0x0)                            (4|4=4)     #88
$LN11@fib$init:                                                         ; uses = 1
t138        = OPINTRINSIC(IV_RESUMABLE_FRAME_PTR)            (8|8=N)     #88
t143        = OPARG       &$T5                              (8|8=8)     #88
              OPCALL      "::suspend_always::await_resume()", t143       #88
PRAGMA        OPBLKEND    <NULL>
PRAGMA        OPBLKEND    <NULL>                                         #97
$LN1@fib$init:                                                           ; uses = 1
EXIT                                                                     #97
```

Fig. 7

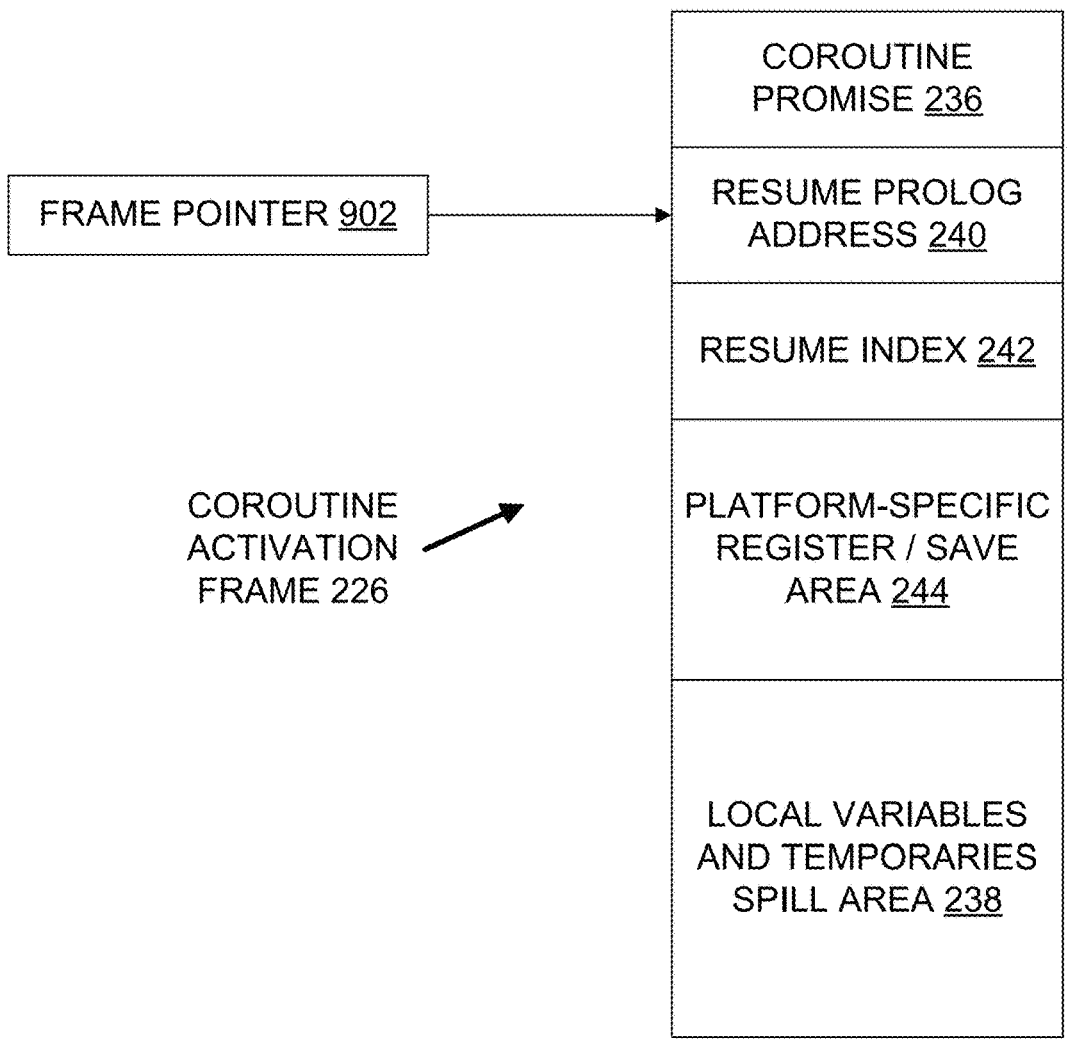

Fig. 9

```
ENTRY      ?Main@@YAXXZ ()                       #67
BLOCK 1 In(0) Out(2)
PRAGMA      OPBLKSTART <NULL>
t65.i64    = OPARG.i64 &??_C@_0N@ECKFFPFM@?6earlyExit?3?6?$AA@.i64 (8|8=8) #68     #1

OPCALL.cdecl.i32 &printf.i64, t65.i64   (4|N=8,8)   #68

(*COROUTINE,Fib )
t66.i64    = OPARG.i64 &f$.i64              (8|8=8)    #69

OPCALL.cdecl.i64 &?Fib@@YA?AUgenerator@@XZ.i64, t66.i64 (8|N=8,8) #69

PRAGMA      OPBLKSTART <NULL>
BLOCK 2:V In(4,1) Out(5,3)
$LN2@earlyExit:                         ; uses = 1
           OPINLINEARGS.vd &f$.i64         (0|N=8)       #70
PRAGMA      OPINLINESTART
BLOCK 1 In(0) Out(3)                            #70
PRAGMA      OPBLKSTART <NULL>                   #70
PRAGMA      OPBLKSTART <NULL>                   #70

(*COROROUTINE, Fib)
 t78.i64   = OPADD.i64 &f$.i64, 0(0x0)$$$.i64    (8|8=8,8)   #70
 this$.i64 = OPASSIGN.i64 t78.i64             (8|8=8)       #70

BLOCK 1 In(0) Out(3)                            #70
PRAGMA      OPBLKSTART <NULL>                   #70
 t91.i64   = OPADD.i64 this$.i64, 0(0x0)$$$.i64   (8|8=8,8)   #70
 t92.i64   = OPARG.i64 [t91.i64].i64           (8|8=8,8)   #70
 t93.i64   = OPARG.i64 0(0x0).i64              (8|8=8)     #70
                                                                    #2
(*COROUTINE, Fib)
 t89.i64   = OPADD.i64 this$.i64, 0(0x0)$$$.i64   (8|8=8,8)   #70
 t90.i64   = OPADD.i64 [t89.i64].i64, 0(0x0)$$$.i64 (8|8=8,8) #70
           OPCALL.cdecl.vd [t90.i64].u64, t93.i64, t92.i64 (0|N=8,8,8,8) #70

(*COROUTINE)
 t95.i64   = OPADD.i64 this$.i64, 0(0x0)$$$.i64   (8|8=8,8)   #70
                                                                    #3
 t128.i64  = OPARG.i64 [t95.i64].i64           (8|8=8,8)   #70
           OPINTRINSIC.u64(IV_CORO_RESUME) t128.i64 (8|N=8)   #70
```

Fig. 8

COMPILER OPTIMIZATION OF COROUTINES

RELATED APPLICATION

The present application claims priority to, and hereby incorporates by reference the entirety of, U.S. Patent Application No. 62/153,556 filed Apr. 28, 2015.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In computing, a coroutine can be viewed as a generalized routine entity which supports suspend and resume operations in addition to the invoke and return operations that are typically supported by routines. That is, a coroutine can be invoked (a.k.a. called) and upon completion can return a value to the caller, and in this sense operates like other kinds of routine entities (e.g., functions, procedures). In addition, however, a coroutine can suspend execution, pass control to another piece of code (possibly yielding a value as well), and later resume execution at the point of suspension. Some coroutines have multiple suspension points. Some are re-entrant, i.e., they may be called again (creating another instance) prior to completion of an earlier call. Coroutines can be used when implementing cooperative tasks, exceptions, event loops, iterators, continuations, infinite lists and pipes, for example.

SUMMARY

Some embodiments are directed to the technical problem of reducing memory usage by coroutines. In some situations, a conventional approach to memory allocation by coroutines will exhaust available memory, making it impractical or impossible to run a given program on a given system, but using one or more optimizations described herein helps reduce memory usage enough to allow an optimized version of the same program to run on the same system.

Some embodiments identify coroutines whose activation frames can be allocated on a caller's stack, as an optimization, instead of allocating the frame on the heap as is conventional. For example, when the compiler determines that a coroutine C's life cannot extend beyond the life of the routine R that first calls the coroutine C, the compiler generates code to allocate the activation frame for C on the stack of R, instead of generating code to allocate C's frame from heap memory. In some cases, as another optimization code for coroutine C is also inlined with code for the routine R that calls C.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 5 shows an example tuple listing illustrating initialization and resumption points of a coroutine;

FIGS. 6 and 7 collectively show an example tuple listing illustrating use of compiler intrinsic functions to identify coroutine resumption points;

FIG. 8 shows an example tuple listing annotated to illustrate use-def chaining;

FIG. 9 is a diagram illustrating an example of coroutine activation frame memory layout and access.

DETAILED DESCRIPTION

Acronyms

Figure 1:
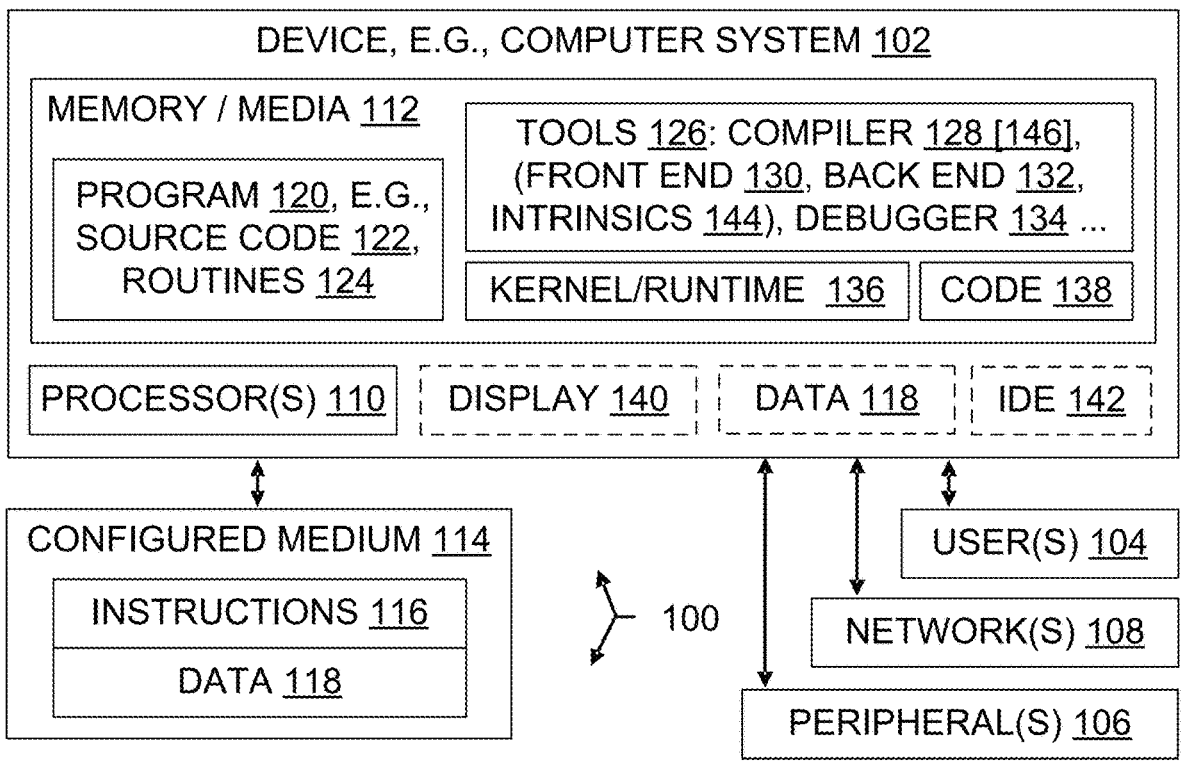
FIG. 1 is a block diagram illustrating a computer system having at least one processor and at least one memory which interact with one another under the control of software, and other items in an operating environment which may be present on multiple network nodes, and also illustrating configured storage medium (as opposed to a mere signal) embodiments.

Some acronyms are defined below, but others may be defined elsewhere herein or require no definition to be understood by one of skill.

ABI: application binary interface
ALU: arithmetic and logic unit
API: application program interface
BE: back end (of compiler, a compiler component responsible for optimizations and lowering to particular architecture machine code)
CD: compact disc
CFG: control flow guard
CIL: common intermediate language (formerly MSIL—Microsoft intermediate language)
CPU: central processing unit
CX: C++ extensions
DVD: digital versatile disk or digital video disc
EBX: an x86 architecture register
EH: exception handling, exception handler
FPGA: field-programmable gate array
FPU: floating point processing unit
GPU: graphical processing unit
GUI: graphical user interface
IDE: integrated development environment, sometimes also called "interactive development environment"
IL: intermediate language
IR: intermediate representation (e.g., in CIL or another IL)
JIT: just in time PC: program counter (a.k.a. instruction pointer)
PPL: parallel patterns library
RAM: random access memory
RBP: an x64 architecture register
ROM: read only memory
SSA: static single assignment (IR form in which each variable is assigned exactly once, and every variable is defined before it is used)
STD: a standard C++ namespace
STL: standard template library
UDT: user-defined type
UTC: Universal Tuple Compiler Note Regarding Hyperlinks Portions of this disclosure contain URLs, hyperlinks, and/or other items which might be considered browser-executable codes. These items are included in the disclosure for their own sake to help describe some embodiments, rather than being included to reference the contents of the web sites that they identify. Applicants do not intend to have these URLs, hyperlinks, or other such codes be active links. None of these items are intended to serve as an incorporation by reference of material that is located outside this disclosure document. Thus, there should be no objection to the inclusion of these items herein. To the extent these items are not already disabled, the Patent Office will disable them (render them inactive as links) when preparing this document's text to be loaded onto its official web database. MPEP § 608.01(VII).

Overview

In some embodiments, coroutines generalize subroutines for cooperative (i.e., non-preemptive) multitasking, by allowing multiple entry points for suspending and resuming execution at certain locations. Coroutines can be used to implement cooperative tasks, exceptions, event loops, iterators, continuations, infinite lists and pipes. Coroutines can also replace ".then" in C++/CX greatly reducing code size. One example herein shows a code generator using a new C++ keyword "yield". An "await" C++ keyword example is also provided. Also discussed are steps in a compiler from the IL being read in from the front end, to register allocation, and final emission of code. Security and optimization are also discussed. Some details given are for an AMD64 processor architecture, but similar functionality and optimizations can be provided for other processor architectures, including for example x86, AMD64, ARM32 and ARM64 architectures.

Some embodiments described herein may be viewed in a broader context. For instance, concepts such as allocating memory, calling a routine, compiling code, and resuming execution, may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, e.g., limited heap memory space, coroutine insecurity. Other media, systems, and methods involving allocating memory, calling a routine, compiling code, and resuming execution are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as running out of heap memory due to use of large numbers of coroutines whose activation frames are allocated on the heap, and how to determine when a coroutine activation frame can safely be allocated elsewhere than on the heap. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein generate stack- or heap-allocation code at compile time for a coroutine, depending on the extent of the coroutine's lifespan. Third, technical effects provided by some embodiments include increasing the number of coroutines that can be run on a given system without crashing due to insufficient memory by a factor of two, or three, or five, or even more in some cases. Fourth, some embodiments include technical adaptations such as yield statements and/or await expressions which implement cooperative (i.e., non-preemptive) scheduling of concurrent processes. Fifth, some embodiments modify technical functionality of a compiler by adding coroutine activation frame allocation optimization based on technical considerations such as use-def analysis. Sixth, technical advantages of some embodiments include increased reliability of concurrent processing, simplified development of programs which use coroutines, and reduced memory hardware requirements.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known to those of skill by another name, such as "task," "process," or even "coroutine," for example, although they will also recognize a more specific meaning herein for "coroutine" in that the coroutines discussed herein are cooperatively scheduled via resumptions and suspensions, are resumable and have at least one resumption point in addition to their initial entry point. Threads in general are typically preemptively scheduled; coroutines herein are non-preemptive unless stated otherwise. The coroutines and other threads discussed herein may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multiprocessor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on. The purpose of a general-purpose processor changes according to the code it is executing. In particular, a processor may be viewed as a compilation processor while it is performing compilation of a program, and the same processor may be viewed later as a target processor when it is executing compiled code that targets the processor's particular architecture. The compilation processor and the target processor may also be different processors, e.g., one can compile code on one machine with a processor P and then run the compiled code on a different machine with a different processor Q.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Coroutines" are software components that provide non-preemptive multitasking. They have multiple entry points, allowing their execution to be suspended and resumed at one or more specified locations within their body.

A "resumable function" is a coroutine which is also a function, namely, it returns a value upon completion. Coroutines may also be implemented as procedures which have side effects but do not directly return a value to the caller.

In a proposed standards document no. N4134 titled "Resumable Functions v.2" which can be viewed, e.g., at www dot open-std dot org/jtc1/sc22/wg21/docs/papers/2014/n4134.pdf, "resumable function" is defined as a "Proposed C++ language mechanism to implement stackless coroutines." For purposes of the present disclosure, however, and as used herein, resumable functions are (a) not necessarily limited to C++ language environments, and (b) not necessarily limited to stackless implementations. As used herein, stackless implementations are those in which (i) the resumable function does not itself allocate stack memory for any local data that need to be available upon resume, or (ii) only the coroutine itself can be suspended—subroutines called from within the coroutine cannot be suspended. Either definition may be used; definition (ii) is presumed in the absence of an explicit choice of definition. In some situations, since a resumable function behaves like a function, it may use a stack to get parameters from the caller, store the return address, and so on. Local data which the function uses, however, is not stored on the stack activation frame, as the frame will get freed when the function returns back to the caller on suspend. "Stackful" implementations are the opposite of stackless ones. Incidentally, the viewing location above that ends in "n4134.pdf" is an example of a disabled hyperlink, and as such is not intended as an incorporation by reference.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine. A coroutine is a particular kind of routine.

"Optimize" means to improve, not necessarily to perfect. For example, it may be possible to make further improvements in a program which has been optimized.

"Program" is used broadly herein, to include applications, kernels, drivers, interrupt handlers, firmware, state machines, libraries, and other code written by programmers (who are also referred to as developers).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject (e.g., allocating, calling, determining, executing, generating, inlining, optimizing, placing, resuming, returning, setting, suspending, using, verifying, or allocates, allocated, calls, called, etc.) may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case, and claims to storage media in a U.S. patent application based on this disclosure should not be interpreted as being directed to signals per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Alternative definitions given herein represent alternative sets of embodiments. Rather than treating these alternative definitions as improper and irreconcilable inconsistencies, the total set of embodiments described should be understood as the set operation union of the individual groups of embodiments which correspond to the respective definitions. This holds for both express and implicit definitions. For example, if one definition states that a coroutine has properties A and B, and another definition states that a coroutine has properties A and C, it does not follow that the term "coroutine" is indefinite. Rather, the term "coroutine" should be understood to encompass in some embodiments those coroutines which have properties A and B as well as encompassing in other embodiments those coroutines which have properties A and C. Other defined terms should be treated similarly to avoid indefiniteness.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In some environments, one or more application programs 120 have source code 122 which includes code for a routine R to call a coroutine C; in this instance, R and C are each examples of routines 124. Software development tools 126 such as compilers 128 assist with software development by transforming source code, e.g., into intermediate code, which is then transformed into executable code, for example. These compiler-produced codes are identified generally as code 138. In the example shown, the compiler 128 includes a front end 130 which performs lexical analysis and parsing, and a back end 132 which generates code 138 specific to a target architecture, e.g., a particular virtual machine architecture or processor 110 architecture. Certain functions known as intrinsics 144 are intrinsic to the compiler, as opposed to being implemented solely in a library distinct from the compiler. Errors in the program may be identified using a debugger 134. The compiled code 138 is executed, with the assistance of a runtime/kernel 136. In some embodiments, a runtime is part of a kernel, while in others several different language-specific runtimes operate on top of a given hardware-specific kernel.

The code 122, 138, tools 126, and other items discussed in the text may each reside partially or entirely within one or more hardware memory media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, display(s) 140, and battery(ies), an operating environment may also include other hardware, such as buses, power supplies, wired and wireless network interface cards, and accelerators, for instance, whose respective operations are described herein to the extent not already apparent to one of skill. The display may include one or more touch screens, screens responsive to input from a pen or tablet, or screens which operate solely for output. CPUs are central processing units, ALUs are arithmetic and logic units, FPUs are floating point processing units, and GPUs are graphical processing units.

A given operating environment may include an Integrated Development Environment (IDE) 142 which provides a developer with a set of coordinated software development tools 126 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

Items discussed are not necessarily part of any particular operating environment or part of all embodiments, but may interoperate with items in the operating environment or some embodiments as discussed herein.

Systems

Figure 2:
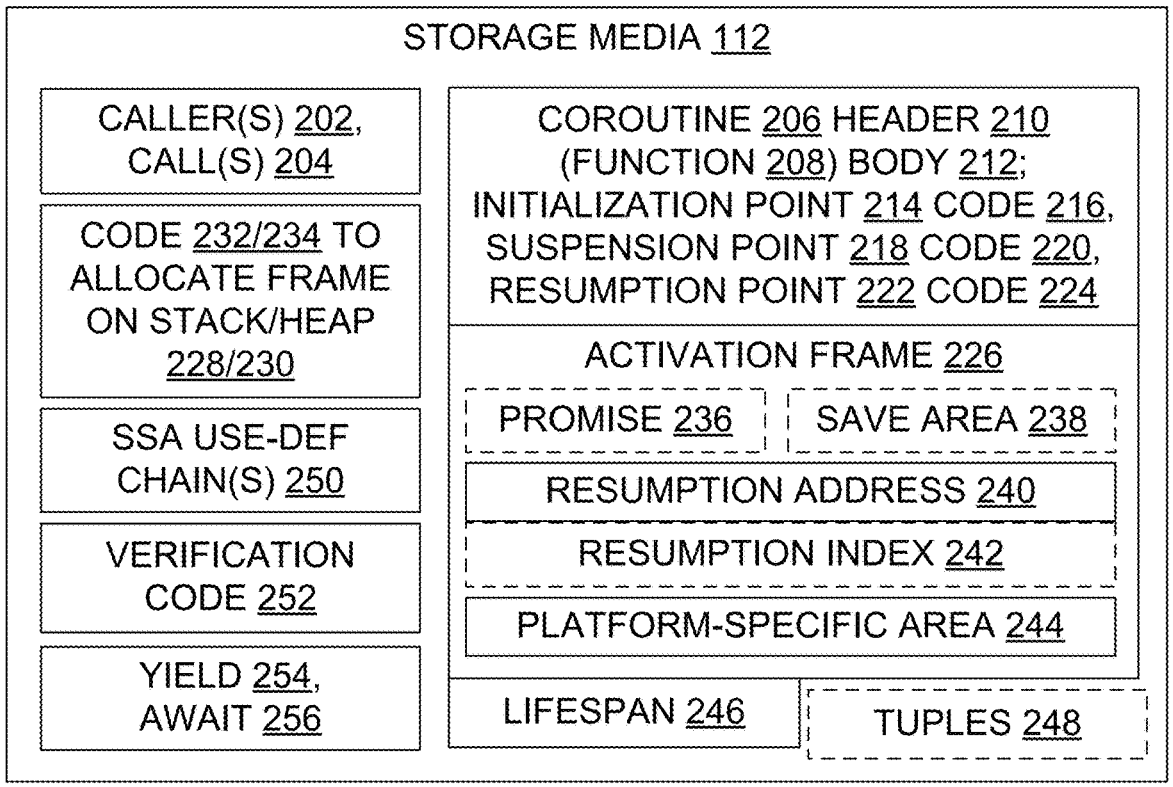
FIG. 2 is a block diagram illustrating a coroutine, coroutine activation frame contents, and aspects of coroutine compilation and/or runtime environments in an example architecture.

FIG. 2 illustrates aspects of an architecture which is suitable for use with some embodiments. Within a program 120, one or more routines 124 call themselves recursively and/or call one or more other routines. Thus, the program includes one or more callers 202 which make calls 204 to one or more routines. In at least one instance, a call is made to a coroutine 206. The coroutine may be a function 208 in that it returns a value to the caller 202 in an expression containing the call, e.g., "x=foo( )+1;" where the coroutine is named foo and the expression containing the coroutine call is "foo( )+1". Or the coroutine may be a procedure which does not return a value at the point it was called, but may still alter a global variable, for example.

The illustrated coroutine 206 includes a header 210 with a parameter list, like other routines, and a body 212 which upon execution performs operations, typically using the parameter(s) and often using local variables whose scope is within the coroutine itself. Other routines also have headers and bodies. Unlike some other routines, coroutine bodies include an initialization point 214 with corresponding initialization code 216 prior to at least one suspension point implemented by corresponding code 220 and one or more resumption points 222 with code 224 that is executed when the coroutine resumes after a suspension.

The illustrated coroutine is implemented in part by an activation frame 226 which contains data used by a system 102 to keep track of where the coroutine's codes are located and the execution state of a coroutine instance. Activation frames 226 may also be referred to simply as "frames" but care should be taken not to confuse coroutine activation frames with stack frames created when a routine of any kind, not necessarily a coroutine, is called. Unless indicated otherwise, "frame" herein refers to a coroutine activation frame. As explained herein, coroutine activation frames are sometimes stored on a stack 228 (which is part of memory 112), but conventionally coroutine activation frames have been stored instead in heap 230 memory 112, not on the stack. A suitable compiler operating as described herein generates stack activation frame code 232 or heap activation frame code 234 which upon execution on a target system will allocate the activation frame 226 on a stack 228 or on the heap 230, respectively.

The illustrated activation frame 226 contains or may contain data for a promise 236, save area 238, resumption address 240, resumption index 242, and platform-specific area 244. The actual layout of these items in memory in a given embodiment does not necessarily match the order of their reference numbers and/or their diagrammatic layout in FIG. 2. For example, FIG. 9 shows a layout for one implementation, with a frame pointer 902 (a.k.a. FIGS. 6 and 7 IV_RESUMABLE_FRAME_PTR) that is pointing to (i.e., contains the memory address of) a resumption address 240 located in the interior of a block of memory allocated to an activation frame 226. In other implementations, the resumption address 240 is located instead at one edge of memory allocated to an activation frame 226.

In some implementations, a coroutine promise 236 is a data area which is designed and allocated to contain library specific data required for implementation of a higher-level abstraction exposed by a coroutine 206. For example, in some environments a coroutine implementing a task-like semantics providing an eventual value via std::future<T> is likely to have a coroutine promise that contains std::promise<T>. A coroutine 206 implementing a generator may have a promise 236 that stores a current value to be yielded and a state of the generator (active/cancelling/closed).

In some implementations, a save area 238 is a data area which is designed and allocated to contain local variables of the coroutine 206 in question. It may also be referred to as an area designated for temporaries and/or as a spill area.

In some implementations, a resumption address 240 points to the code 224 to which control will pass when the coroutine instance represented by this activation frame next resumes execution. In some, the resumption address 240 is a base and the actual address at which execution resumes depends on the value of the resumption index 242, e.g., does control pass to code 224 at a first resumption point 222, or to code 224 at a second resumption point 222, or to code 224 at a third resumption point 222, and so on. In some implementations, verification code 252 is executed to ensure that the resumption address 240 is valid, to prevent changes that would have control pass to malware.

In some implementations, a platform-specific area 244 is a data area which is designed and allocated to contain platform-specific data such as register values, or pointers to global data structures.

The illustrated coroutine has a lifespan 246, namely, a scope within which a given instance of the coroutine can exist. Scope is defined in terms of expressions and other code 122 which contain the call 204 to the coroutine. The choice between putting a frame 226 on the heap or on the stack may be based, at least in part, on the extent of the corresponding coroutine's lifespan, which may be assessed using static single assignment (SSA) use-def chains 250.

The illustrated coroutine is implemented, at least in part, using tuples 248 or another intermediate representation which is generally closer to a given machine architecture than source code 122 but not itself directly executable on a processor 110. Some examples of one kind of tuples 248 are shown in FIGS. 5 through 8.

In some implementations, coroutines are used to help implement yield 254 and/or await 256 expressions, but coroutines may also be used without such statements.

Some embodiments provide a computer system 102 with a logical processor 110 and a memory medium 112 configured by circuitry, firmware, and/or software to provide technical effects such as caller stack allocation of coroutine activation frames directed at technical problems such as running out of heap memory, by extending functionality with compiler optimization of coroutine frame allocation as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, a program's source code may be on multiple devices/systems 102 in a networked cloud, a compiler may rune to compile the source code on yet other devices within the cloud, and the resulting executable code may runs and configure the display on yet other cloud device(s)/system(s).

Some embodiments provide a computer system 102 which includes a compilation processor 110, a memory 112 in operable communication with the compilation processor, and a program source code 122 residing in the memory. The program source code includes a call 204 to a coroutine 206 by a caller 202. A static single assignment use-definition chain 250 residing in the memory is based on a definition of the coroutine 206 in the program source code 122 and is also based on at least one use of the coroutine 206 in the program source code 122, e.g., a call 204 to the coroutine 206. A compiler 128 residing in the memory has coroutine compilation code, e.g., portions of a front end 130, back end 132, code 144 implementing intrinsic functions, and/or other code 146 of the compiler 128 which is used in compiling a coroutine. The coroutine compilation code 146 of the compiler 126 interacts with the compilation processor 110 and memory 112 to perform, upon execution, a process which includes (a) determining with an analysis of the static single assignment use-definition chain 250 whether the coroutine 206 has a lifespan 246 that will not extend beyond the call 204 when the call is executed by a target processor 110, (b) when the coroutine lifespan will not extend beyond the call, the compilation processor generating code 232 which upon execution by the target processor allocates an activation frame 226 of the coroutine from a local stack memory 228 of the caller 202, and (c) when the coroutine lifespan can extend beyond the call, the compilation processor generating code 234 which upon execution by the target processor allocates the activation frame 226 from a heap memory 230.

In some examples, the activation frame 226 includes a resumption index 242, namely, an ordinal whose value distinguishes between a plurality of execution resumption points 222 in the coroutine. In other examples, it does not.

In some examples, the activation frame includes a promise portion 236 which the target processor initialized in executing the code 138 compiled from the program source code, and a platform-specific register save area 244 initialized by a runtime 136. In other examples, the promise 236 and/or the platform-specific area 244 are not part of the activation frame.

Some examples include at least a first coroutine piece and a second coroutine piece residing in the memory, e.g., initialization code 216 and resumption code 224. The coroutine pieces are delimited by an initial suspension point 218 of the coroutine. The first coroutine piece includes an initialization portion of the coroutine which the target processor executes up to the initial suspension point, whereas the second coroutine piece includes a resumption portion that the target processor executes after at least one suspension point of the coroutine.

In some examples, the coroutine compilation code 146 identifies coroutine initialization, suspension, and resumption points 214, 218, 222, respectively, by using intrinsics 144 in an intermediate language that is produced from the program source code 122. For instance, intrinsics 144 in tuples 248 can be used by a compiler's parsing front end to identify points 214, 218, and/or 222 to the compiler's target processor code generating back end, as illustrated by FIGS. 6 and 7.

In some examples, the compiled coroutine code 138, 232, upon execution by one or more target processors 110, allocates the activation frame 226 of the coroutine from a local stack memory 228 of the caller, and also executes at least a portion of the coroutine inline with the caller of the coroutine. In other examples, the activation frame is on the stack, but the coroutine body 212 is not inline with the caller 202.

In some examples, the coroutine includes at least one of the following: a yield statement 254, an await expression 256. In particular, in some examples a yield statement of the form <yield-keyword><expression> is used in an iterator to return values of the <expression> on at a time; the next value is returned each time the yield statement is executed. The yield-keyword may be "yield" or some other keyword, depending on the programming language, for instance. In some examples an await expression is applied to a task in an asynchronous method to suspend the execution of the method until the awaited task completes. The task represents ongoing work. The actual keyword used to implement an await expression may vary depending on the programming language.

Processes

Figure 3:
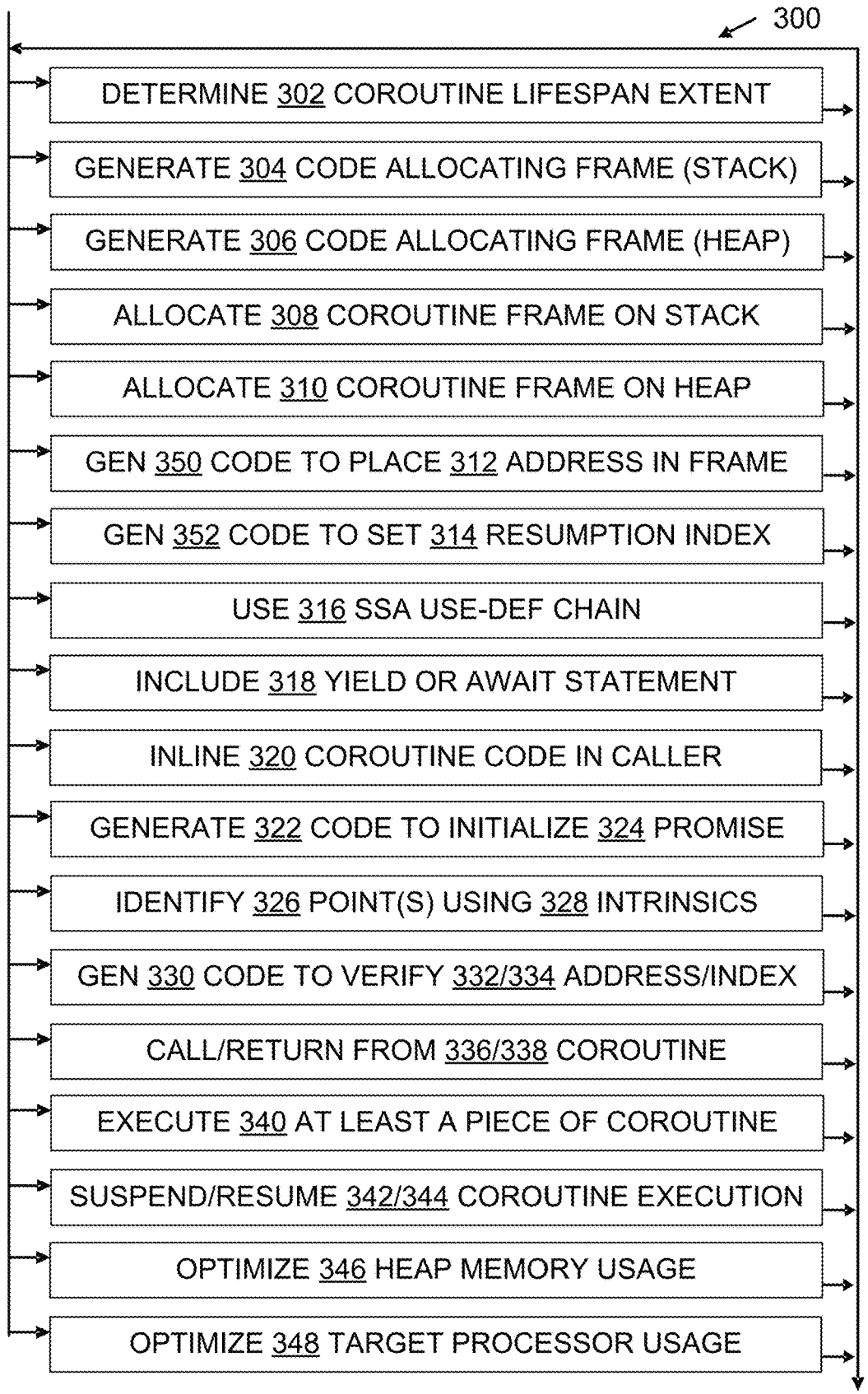
FIG. 3 is a flow chart illustrating steps of some processes and configured storage medium.
Figure 4:
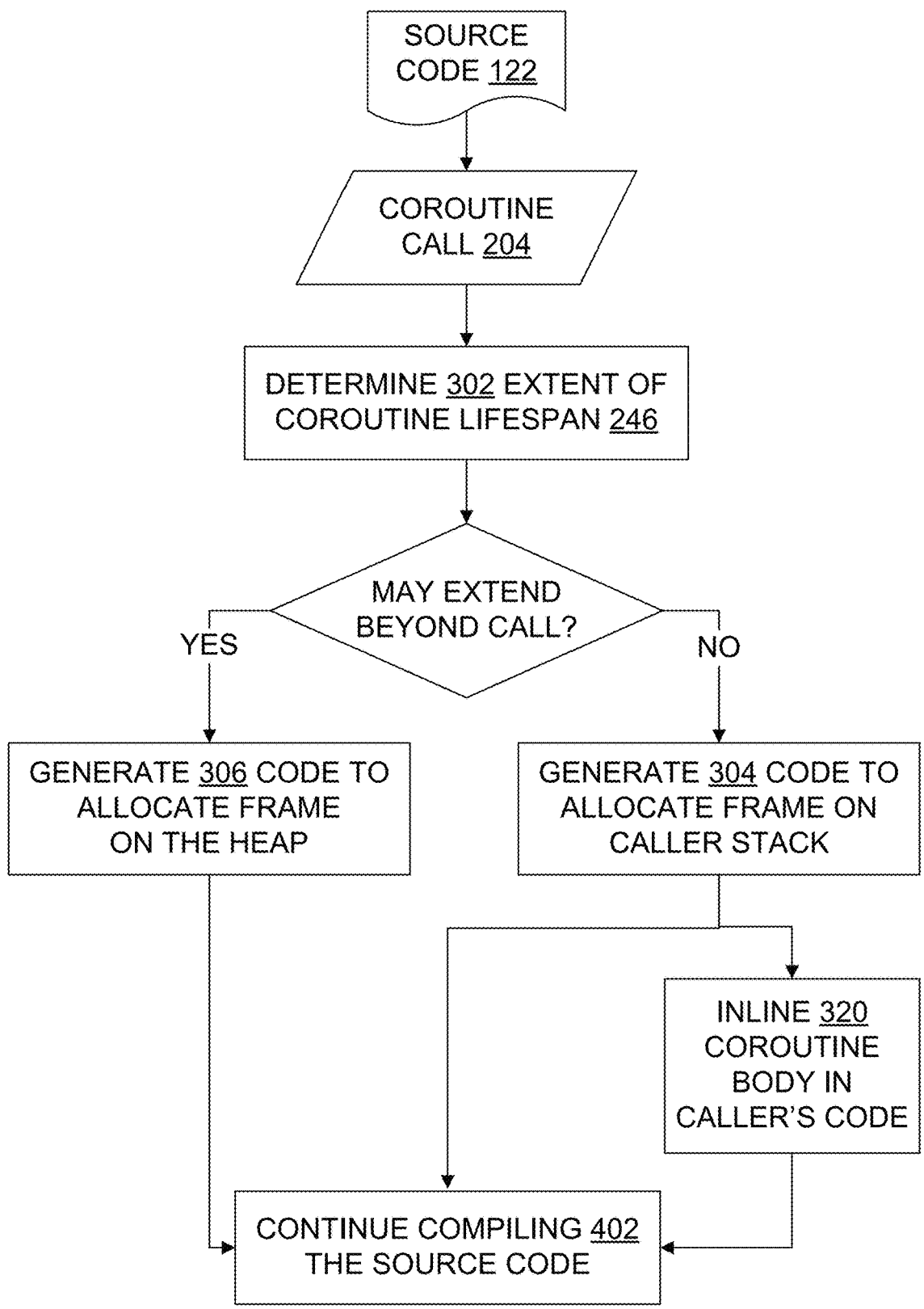
FIG. 4 is a data flow diagram illustrating memory optimization for coroutine frame allocation.

FIG. 3 illustrates some process embodiments in a flowchart 300. Technical processes shown in the Figures or otherwise disclosed may be performed in some embodiments automatically, under control of a compilation or build script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim. In particular, the data flow diagram in FIG. 4 illustrates a flow of steps which overlaps the flows illustrated by FIG. 3, but omits some steps shown as options in FIG. 3 and adds other steps which are not shown in FIG. 3.

Thus, examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some examples provide a method (a.k.a. technical process, algorithm) for implementing a resumable function (a coroutine which is also a function). In some examples, the method includes a compiler determining 302 at compile 402 time whether the resumable function has a lifespan that will not extend beyond a call to the resumable function made by a caller in a computing system. When the compiler determines 302 that the resumable function lifespan will not extend beyond the call, the compiler generates 304 code which upon execution will allocate 308 an activation frame of the resumable function from a local stack memory of the caller in the computing system, instead of from the heap 230, thereby optimizing 346 heap memory usage by reducing it without requiring removal of the coroutine's functionality from the program 120. By contrast, when the compiler determines 302 that the resumable function lifespan can extend beyond the call (which encompasses determining 302 that the lifespan does extend thus, or determining 302 that it might), the compiler generates 306 code which upon execution 340 will allocate 310 the activation frame from a heap memory in the computing system. The compiler may determine 302 an extent of the resumable function lifespan at least in part by using 316 a static single assignment use-definition chain 250.

Some methods include the compiler generating 350 code 138 which upon execution 340 places 312 a resumption address 240 in the activation frame. The resumption address places is the memory address of a resumable portion 224 of a function body 212 of the resumable function 206, 208.

Some methods include the compiler generating 352 code 138 which upon execution sets 314 a resumption index 242 in the activation frame. The resumption index is an ordinal whose value distinguishes between a plurality of execution resumption points 222 in a function body of the resumable function.

In some methods, the resumable function includes 318 at least one of the following: a yield statement 254, an await expression 256.

In some methods, during compilation 402 the compiler inlines 320 code of the resumable function 208 in the caller of the resumable function. Various criteria can be used in choosing whether to inline the function, such as whether increased execution 340 speed from inlining code is offset by an increase in executable code 138 size or a need to swap out registers more frequently, for example. More generally, although inlining may improve a program's time and space usage at runtime, thus optimizing 348 target processor usage, inlining may also increase the size of the program's binary file. Inlining tends to improve code execution speed, but may also decrease performance. For example, inserting multiple copies of a routine may increase code size enough that the code no longer fits in a cache, resulting in more cache misses. In an embedded system, having a smaller code size may be more important than having faster code execution, thus making inlining unattractive for that particular system. In some systems, added variables from inlining may increase processor 110 register usage enough to cause extra RAM 112 accesses, thereby decreasing program execution speed. Moreover, some routines cannot be inlined, such as some recursive routines.

In some examples, the method includes the compiler generating 322 code which upon execution 340 initializes 324 a promise data structure in the activation frame.

In some examples, the compiler includes a front end 130 and a back end 132. During compilation 402, the front end performs lexical analysis and parsing for a particular programming language, and the back end converts output from the front end into tuples 248 which include machine-independent opcodes and symbolic operands. The front end may identify 326 the following to the back end: (a) an initialization point 214 of the resumable function, (b) at least one suspension point 218 of the resumable function, and (c) a resumption point 222 for each suspension point, indicating where execution 340 of the resumable function will resume 344 after execution has been suspended 342 at that suspension point. In particular, in some methods the compiler front end identifies 326 resumable function initialization, suspension, and resumption points to the compiler back end using 328 intrinsics.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as use-definition chains, in the form of data 118 and instructions 116, read from a removable medium 114 and/or another source such as a network connection, to form a configured medium. The configured medium 112 is capable of causing a computer system to perform technical process steps for coroutine optimization during compilation 402 as disclosed herein. FIGS. 1 through 4 and 9 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

A use-definition chain (a.k.a. graph) represents a use of a variable and all the definitions of that variable which can reach that use without any other intervening definitions.

In some embodiments, a computer-readable storage medium 114 is configured with data and with instructions that upon execution by at least one processor in a compilation computing system 102 will cause the at least one processor 110 to perform a technical process for coroutine compilation 402. The process (a.k.a. technical method) includes determining 302 at compile time whether a coroutine has a lifespan that will not extend beyond a call to the coroutine that will be made by a caller in a target computing system. When the coroutine lifespan will not extend beyond the call, the process includes generating 304 code which upon execution 340 by a processor in the target computing system allocates an activation frame of the coroutine from a local stack memory of the caller in the target computing system 102. When the coroutine lifespan can extend beyond the call (including when it clearly does extend thus), the process includes generating 306 code which upon execution in the target computing system allocates the activation frame from a heap memory in the target computing system. The process also includes generating 350 code which upon execution in the target computing system places 312 a resumption address in the activation frame, the resumption address being the address of a resumable portion of the coroutine 206.

In some embodiments, the process further includes generating 322 code which upon execution 340 in the target computing system initializes 324 a promise data structure in the activation frame.

In some embodiments, the process further includes at least one of the following: generating 330 code 252 which upon execution in the target computing system verifies 332 that a resumption address value specified in the activation frame is a valid value before passing control based on that resumption address value; generating 330 code 252 which upon execution in the target computing system verifies 334 that a resumption index value specified in the activation frame is a valid value before passing control based on that resumption index value. For instance, the compiler may generate a list or other data structure enumerating valid values for resumption points 222, and the code 252 may check a given resumption address value against that list of valid values. Similarly, the compiler may keep track of the number of suspension-resumption point pairs in a given coroutine, and generate code 252 to use that value as an upper limit on the resumption index value.

The computer-readable storage medium may be configured to perform any process described herein, including those within the scope of FIG. 3 or FIG. 4 as discussed elsewhere herein. For instance, in some embodiments the computer-readable storage medium process determines 302 an extent of the coroutine lifespan at least in part by using 316 a static single assignment use-definition chain 250.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from Microsoft Visual Studio® 2015 documentation (mark of Microsoft Corporation). Visual Studio® tools include software implemented by Microsoft Corporation. Aspects of the Visual Studio® software and/or documentation are consistent with or otherwise illustrate aspects of the embodiments described herein. However, it will be understood that Visual Studio® documentation and/or implementation choices do not necessarily constrain the scope of such embodiments, and likewise that Visual Studio® software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

As an example of coroutine usage, consider a yield keyword (or similar functionality under a different name, e.g., "_yield_value") proposed for addition to C++ 2017. It could be used in a yield statement 254 in code 122 like this:

```
#define #include <experimental\generator>
generator<char> H( ) {
    for (auto c: "Hello, and welcome to this world\n") {
        yield c; // Return c and suspend
    }
}
int main( ) {
    generator g = H( );
    generator::Iterator b = g.begin( );
    generator::Iterator e = g.end( );
    // for (char c: H( ))
    while (b != e) {
        char c = *b; // Resume H( ) after the yield
        std::cout << c << std::endl;
        ++b;
    }
    return 0;
}
```

This code when compiled and executed will print every character in the string literal "Hello, and welcome to this world\n," a character at a time. In H( ), the system will suspend execution at the back edge of the loop and return a single character to main( ) The proposed C++ yield statement triggers code generation to save a resumable code address and save live registers in a frame data structure 226 that UTC created on the heap (that is, at compile time UTC generated code to create the frame on the heap during runtime). Once the registers and a place to resume have been saved, the remaining UTC-generated code will execute a normal return 338 sequence with an epilogue. While code is executing in the loop body in main the frame for H0 is still live in the heap and main( ) will hold a pointer to it so that it may resume at a location in H( ). An optimization 346 for this code generation is to allocate 308 the resumable frame 226 on the stack for main, instead of allocating it on the heap, and a related optimization 348 is to inline 320 the body of the resumable code.

A proposed C++ await expression can be similarly optimized. The await expression (or similar functionality under another keyword) 256 could be used in code 122 like this:

```
std::future<ptrdiff_t> tcp_reader(int total)
{
    char buf[64 * 1024];
    ptrdiff_t result = 0;
    // This _await expression does not block on the
connection request
    // Store a callback to invoke when the OS is done.
    // That call back will be a resumable PC in this
coroutine after this statement.
        auto conn = ___await Tcp::Connect("127.0.0.1", 1337);
        do
        {
        // At following line, the _await expression does not
block this thread for conn.Read( )
        // When conn.Read( ) completes, it invokes a call back
which will be a resumable PC
        // in this coroutine which would be the statement "–
total –= bytesRead."
            auto bytesRead = ___await conn.Read(buf,
```

-continued

```
sizeof(buf));
            total –= bytesRead;
            result += std::count(buf, buf + bytesRead, 'c');
        }
        while (total > 0);
        return result;
}
```

In this example, the _await expression does not block the thread on which it is executing. Instead, its presence in the source code causes the compiler to generate code that signs up the rest of tcp_reader( ) as a continuation. Control then returns to the caller of the async method. When the task completes, it invokes its continuation which is the call back function stored away as a resumable PC, and the method resumes where it left off.

From the perspective of a programming language user (software developer) 104, await can be very valuable. But in some embodiments after a compiler front-end is done with an await expression, the expression becomes like yield in the compiler's back-end.

Fundamentally, a coroutine is a function that in addition to normal call 336 and return 338 operations also supports suspend 342 and resume 344 operations. The compiler front end 130 translates await and yield (for example) into suspend and resume operations observed by the back end (BE) 132. Thus, for present purposes yield and await are just two of many possible examples showing how coroutines can manifest to the user of the language. The BE deals with suspend and resume. The front end deals with yield, await, and/or other language features that provide coroutines in source code. Likewise, although C++ 2017 is used as an example, other programming languages also either support coroutines or could be extended to support coroutines, including, for example, Dart (proposed), D, Hack, JavaScript (proposed), Modula-2, Perl, Python, Ruby, and others. Optimizations like those described herein can also be utilized in compilers (e.g., JIT compilers) 128 for other languages that have coroutine-like language facilities.

Coroutines can run on single-core systems 102, or multicore systems 102. They can run on a single machine, or on different machines within a distributed system 102.

In some embodiments, coroutines can be understood by comparing them to subroutines. When a subroutine is invoked 336, execution begins at the start of the subroutine, and once the subroutine exits 338, it is finished. An instance of a subroutine only returns control once after the instance is entered, and the subroutine does not hold any state information between invocations of the subroutine. By contrast, coroutines can exit by calling other coroutines, which may later return to the point where they were invoked in the original coroutine. From the coroutine's point of view, it is not exiting but calling another coroutine. Thus, a coroutine instance holds state, and there can be multiple instances of a given coroutine at once during a program's execution. One difference between (a) calling another coroutine by yielding control to it and (b) calling another routine (which would eventually return control to the original point of the call), is that under control transfer (a) the latter coroutine is entered in the same continuous manner as the former coroutine. The relation between two coroutines which yield to each other can be viewed as not that of caller-callee, but instead as symmetric.

In some embodiments, coroutines are implemented with continuations. A continuation is a data structure that represents a computational process at a given point in the process's execution. But instead of being hidden in a runtime, the continuation data can be accessed within the programming language. A first-class continuation, for example, saves the execution context of the program. Continuations can be implemented using activation frames 226 to hold the execution state information in a resumption address 240, or in a resumption address 240 plus a resumption index 242, for example.

In some embodiments, the compiler front-end annotates for the compiler back-end where each suspend point goes in a coroutine, where an initialization part of the coroutine is, and where a resume part is located. In particular, in some implementations the compiler front-end and BE communicate by using 328 intrinsics as annotation. As an example, the following intrinsics 144 may be used in explaining high level code generation:

_resumable_save( )—store all the live registers, and a resumable program counter (PC) 240

_resumable_suspend( )—jump to the epilogue of the function and return

_resumable_cancel( )—tear down the frame structure 226 and jump to the epilogue Some embodiments include intrinsics such as some or all of the following:

```
/***
*resumable
*Copyright (c) Microsoft Corporation. All rights reserved.
*Purpose: Library support of stackless resumable functions
*          http://isocpp.org/files/papers/N4134.pdf
*       [Public]
****/
#pragma once
#ifndef _RESUMABLE_
#define _RESUMABLE_
#ifndef RC_INVOKED
#include <new>
//#pragma pack(push,_CRT_PACKING)
#pragma push_macro("new")
#undef new
#if 1
extern "C" size_t _coro_resume(void*);
extern "C" void _coro_destroy(void*);
extern "C" size_t _coro_done(void*);
#pragma intrinsic(_coro_resume)
#pragma intrinsic(_coro_destroy)
#pragma intrinsic(_coro_done)
#endif
_STD_BEGIN
```

One of skill will recognize that this paragraph of text is not part of the source code per se, but is rather a commentary upon it. This commentary is provided to help readers understand the source code in which it is injected, and to help this disclosure comply with regulations regarding the format and content of disclosure which include source code listings. Although an experimental namespace is used in this source code, in production embodiments other namespaces, including namespaces which are production grade rather than experimental, may also be used.

```
namespace experimental {
    // TEMPLATE CLASS coroutine_traits
    template <typename _Ret,
        typename... _Ts>
    struct coroutine_traits
    {
        using promise_type = typename _Ret::promise_type;
    };
```

```
    // TEMPLATE CLASS coroutine_handle
    template <typename _PromiseT = void>
    struct coroutine_handle;
    // TEMPLATE CLASS coroutine_handle<void> – no promise access
    template <>
    struct coroutine_handle<void>
    {
        coroutine_handle( ) noexcept = default;
        explicit coroutine_handle(std::nullptr_t) noexcept
            : _Ptr(nullptr)
        {
        }
        coroutine_handle& operator=(nullptr_t) noexcept
        {
            _Ptr = nullptr;
            return *this;
        }
        static coroutine_handle from_address(void* _Addr) noexcept
        {
            coroutine_handle _Result;
            _Result._Ptr =
reinterpret_cast<_Resumable_frame_prefix*>(_Addr);
            return _Result;
        }
        void* to_address( ) const noexcept
        {
            return _Ptr;
        }
        void operator( )( ) noexcept
        {
            resume( );
        }
```

One of skill will recognize that different formatting styles may be used in source code without altering the functionality of the resulting code once it is compiled. For example, as the next two functions illustrate, an opening brace for a function's body may be placed on the line following the function's name and parameter list, or it may be placed on the same line as the function's name and parameter list:

```
        explicit operator bool( ) const noexcept
        {
            return _Ptr != nullptr;
        }
        void resume( ) {
            _coro_resume(_Ptr);
        }
        void destroy( ) {
            _coro_destroy(_Ptr);
        }
        bool done( ) const {
            // TODO return _coro_done( ) == 0; // when hooked up
            return (_Ptr->index == 0);
        }
        struct _Resumable_frame_prefix
        {
            typedef void (__cdecl *_Resume_fn)(void*);
            _Resume_fn _Fn;
            size_t index;
        };
    protected:
        _Resumable_frame_prefix* _Ptr;
    };
    // TEMPLATE CLASS coroutine_handle<_PromiseT> – general form
    template <typename _PromiseT>
    struct coroutine_handle
        : coroutine_handle<>
    {
        coroutine_handle( ) noexcept = default;
        using coroutine_handle<>::coroutine_handle;
        static coroutine_handle from_promise(_PromiseT*
```

```
        __Prom) noexcept
        {
                auto __FramePtr =
reinterpret_cast<char*>(__Prom) + __ALIGNED_SIZE;
                coroutine_handle<__PromiseT> __Result;
                __Result.__Ptr =
reinterpret_cast<__Resumable_frame_prefix*>(__FramePtr);
                return __Result;
        }
        coroutine_handle& operator=(nullptr_t) noexcept
        {
                __Ptr = nullptr;
                return *this;
        }
```

One of skill will recognize that certain functions are built-in (natively supported, or supported via standard libraries) in many programming languages. One example is the sizeof( ) function, which returns the memory storage size of a data type:

```
        static const size_t __ALIGN_REQ = sizeof(void*) *
2;
        static const size_t __ALIGNED_SIZE =
                ___is_empty(__PromiseT)
                ? 0
                : ((sizeof(__PromiseT) + __ALIGN_REQ - 1) &
~(__ALIGN_REQ - 1));
                __PromiseT& promise( ) noexcept
                {
                        return
*reinterpret_cast<__PromiseT*>(reinterpret_cast<char*>(__Ptr)
- __ALIGNED_SIZE);
                }
                __PromiseT const& promise( ) const noexcept
                {
                        return *reinterpret_cast<__PromiseT
const*>(reinterpret_cast<char const*>(__Ptr) -
__ALIGNED_SIZE);
                }
        };
        struct __Coroutine_frame_placeholder {
                _Coroutine_frame_placeholder( );
                ~_Coroutine_frame_placeholder( );
        };
        template <typename __PromiseT>
        bool operator==(coroutine_handle<__PromiseT> const&
_Left,
                coroutine_handle<__PromiseT> const& __Right)
noexcept
        {
                return __Left.to_address( ) == __Right.to_address( );
        }
        template <typename __PromiseT>
        bool operator!=(coroutine_handle<__PromiseT> const&
_Left,
                coroutine_handle<__PromiseT> const& __Right)
noexcept
        {
                return !(__Left == __Right);
        }
```

One of skill will recognize that "trivial" does not necessarily mean unimportant, but may instead mean "easy" or "straightforward".

```
        // trivial awaitables
        struct suspend_if
        {
                bool __Ready;
                explicit suspend_if(bool __Condition) noexcept
                        : __Ready(!__Condition)
                {
                }
                bool await_ready( ) noexcept
                {
                        return __Ready;
                }
                void await_suspend(coroutine_handle<>) noexcept
                {
                }
                void await_resume( ) noexcept
                {
                }
        };
        struct suspend_always
        {
                bool await_ready( ) noexcept
                {
                        return false;
                }
                void await_suspend(coroutine_handle<>) noexcept
                {
                }
                void await_resume( ) noexcept
                {
                }
        };
        struct suspend_never
        {
                bool await_ready( ) noexcept
                {
                        return true;
                }
                void await_suspend(coroutine_handle<>) noexcept
                {
                }
                void await_resume( ) noexcept
                {
                }
        };
        template <typename __Ret,
                typename... __Ts>
```

One of skill will recognize that in this source code "struct" refers to a data structure definition.

```
        struct __Resumable_helper_traits
        {
                using __Traits = coroutine_traits<__Ret,
__Ts...>;
                using __PromiseT = typename
__Traits::promise_type;
                using __Handle_type =
coroutine_handle<__PromiseT>;
                static __PromiseT * __Promise_from_frame(void*
__Addr) noexcept
                {
                        return
reinterpret_cast<__PromiseT*>(reinterpret_cast<char*>(__Addr)
- __Handle_type::__ALIGNED_SIZE);
                }
                static __Handle_type __Handle_from_frame(void*
__Addr) noexcept
                {
                        return
__Handle_type::from_promise(__Promise_from_frame(__Addr));
                }
                static void __Set_exception(void* __Addr) {
                        __Promise_from_frame(__Addr)-
>set_exception(std::current_exception( ));
                }
                __declspec(noinline) static void *
__Alloc(size_t size) noexcept {
                        auto p = new char[size +
__Handle_type::__ALIGNED_SIZE];
                        printf("%p: allocated bytes %d\n", p,
```

-continued

```
            size + __Handle_type::__ALIGNED_SIZE);
            p += __Handle_type::__ALIGNED_SIZE;
            return p;
        }
        __declspec(noinline) static void __Free(size_t
size, void* frame_ptr) noexcept {
            auto p =
reinterpret_cast<char*>(frame_ptr) -
__Handle_type::__ALIGNED_SIZE;
            printf("%p: deleting bytes %d\n", p,
size + __Handle_type::__ALIGNED_SIZE);
            delete p;
        }
```

One of skill will recognize that the use of reinterpret_cast involves interpreting raw data as representing a data type which may differ from the data type the raw data previously represented.

```
        static void __ConstructPromise(void* __Addr,
void* resume_addr) {
            *reinterpret_cast<void**>(__Addr) =
resume_addr;
            *reinterpret_cast<uintptr_t*>((uintptr_t)__Addr +
sizeof(void*)) = 2;
            auto __Prom = __Promise_from_frame(__Addr);
            new ((void*)__Prom) __PromiseT( );
        }
        static void __ConstructReturnValue(void*
__Addr, void* __RetVal) {
            auto __Prom = __Promise_from_frame(__Addr);
            new ((void*)__RetVal) __Ret (__Prom-
>get_return_object( ));
        }
        static void __DestructPromise(void* __Addr) {
            __Promise_from_frame (__Addr)-
>~__PromiseT( );
        }
    };
} // namespace experimental
_STD_END
// resumable functions support intrinsics
```

One of skill will recognize that code functionality does not require particular identifiers, in the sense that renaming all instances of one identifier X to become another identifier Y generally produces functionally identical code, barring a name clash with the identifier Y by another part of the code.

```
    // TODO: rename __resumable_xxx => __coro_xxx
    extern "C" size_t __coro_frame_size( );
    extern "C" void* __coro_frame_ptr( );
    extern "C" void __coro_init_block( );
    extern "C" void* __coro_resume_addr( );
    extern "C" void __coro_init_frame(void*);
    extern "C" void __coro_save(size_t);
    extern "C" void __coro_suspend(size_t);
    extern "C" void __coro_cancel( );
    extern "C" void __coro_resume_block( );
    #pragma intrinsic(__coro_frame_size)
    #pragma intrinsic(__coro_frame_ptr)
    #pragma intrinsic(__coro_init_block)
    #pragma intrinsic(__coro_resume_addr)
    #pragma intrinsic(__coro_init_frame)
    #pragma intrinsic(__coro_save)
    #pragma intrinsic(__coro_suspend)
    #pragma intrinsic(__coro_cancel)
    #pragma intrinsic(__coro_resume_block)
    #pragma pop_macro("new")
    //#pragma pack (pop)
    #endif /* RC_INVOKED */
    #endif /* __RESUMABLE__ */
```

For example, the source code
. . . =yield <expr>;
can be expanded into an expression equivalent to

```
    {
        $P.yield_value(expr);
        __resumable_save( );
        __resumable_suspend( );
    }
```

As another example, consider the following C++ source for defining a generator that returns an integer:

```
    generator<int> fib(int n)
    {
        int a = 0;
        int b = 1;
        while (n-- > 0)
        {
            yield a;
            auto next = a + b;
            a = b;
            b = next;
        }
    }
```

This fib( ) functionality might be called as follows:

```
    int main( ) {
        for (auto v : fib(35))
        {
            if (v > 10)
                break;
            cout << v << ' ';
        }
    }
```

In some embodiments, a compiler backend 132 will outline the coroutine fib(int n) into two functions:
_Fib$Init
_Fib$Resume
(_Fib$Destroy might be created as a later optimization in some cases)

The body of _Fib$Init is for allocating 310 and initializing the stack frame (also referred to here as the activation frame) in the heap. The user's original code is placed in _Fib$Resume (wrapped in EH) and it will have as many resume points as there are yield points.

The function main( ) will be expanded into C++ source code 122 (or equivalent code) that looks like:

```
    int main( ) {
        generator g = Fib( );        // UTC gens a call
    __fib$init to create a generator object
        generator::Iterator b = g.begin( );   // After
    inlining UTC gens a call __fib$resume(this)
        generator::Iterator e = g.end( );
        while (b != e) {
            int v = *b;           // After inlining UTC gens a
    call __fib$resume(this)
            if (v > 10)
                break;
            cout << v << ' ';
        }
        return 0;
    }
```

The generator structure "g" will override the operators "*", "!=" and, "++", and Invoke intrinsics in the iterator methods, begin( ), and end( ).

One implementation uses these iterable functions:

```
__forceinline Iterator begin( ) const {
    __coroResume((ResumableFrameSlot*)__fp);
        return Iterator{__fp}; }
    __forceinline Iterator end( ) const { return
Iterator{nullptr}; }
```

Here is a primitive generator data structure (specific to Fib( )) that only returns integers and depends on the three intrinsics. One of skill will understand that this can be generalized and made customizable through templates and library code.

```
// Generator
#include <jims/resumable_handle>
struct generator
{
    struct __promise_type {
int const __CurrentValue;
auto yield_value(int value) {
   this->current_value = value;
}
    }
    resumable_handle<promise_type>* __fp;        // this is the
slot with the
                                                 // PC for
__Fib$resume(void*, void*);
    int current_value( ) {
           return __fp.promise( ).current_value;
    }
    __forceinline ~generator( ) {
__coroDestroy((ResumableFrameSlot *)__fp);}
// The initial resumable PC is set by the value passed into
the constructor
        __forceinline generator(void* __xp) {__fp = __xp; }
        // Not meant to manage the lifetime of the
coroutine. It's a copy for reading an instance
        struct Iterator {
                  resumable_handle<promise_type>* __fp;
                  __forceinline bool operator!= (const Iterator&
rhs) const { return __fp != rhs.__fp; }
           // Null pointer means we are done iterating
                  __forceinline void operator++( ) {
                         __coroResume((ResumableFrameSlot*)__fp);
                         if (__coroDone((ResumableFrameSlot*)__fp))
                                __fp = nullptr;
                  }
              // Simply get the return value in the "promise"
data structure
                  __forceinline int const& operator*( ) const {
                         auto& __Prom = __fp.promise( );
                         return __Prom.__CurrentValue;
                  }
        };
    // Iterable functions
        __forceinline Iterator begin( ) const {
__coroResume((ResumableFrameSlot*)__fp);
                                   return Iterator{__fp}; }
        __forceinline Iterator end( ) const { return
Iterator{nullptr}; }
};
```

FIG. 5 shows an example with tuples 248 for main( ) using the information above.

In general, tuples 248 come initially from the IL (matching it nearly one to one), and eventually get transformed by compilation 402 into machine code.

In this example, the Fib$init( ) function will create the frame 226, initialize it, create the UDT structure, destroy the formals and suspend. In one implementation, tuples for Fib$init( ) look like the listing shown in FIGS. 6 and 7.

Fib$resume( ) will use an index slot 242 in the frame structure 226 for determining which point to resume from.

Recall that a coroutine can have N resumable points 222. This function is also used in this implementation for proper destruction of: (i) objects in the C++ coroutine which are live at that point; (ii) the C++ customizable part of the frame data structure (above the resumable PC slot); and (iii) the UTC part of the frame data structure (below the resumable PC slot and index). Pseudocode for Fib$resume( ) looks like:

```
#include <iostream>
__Fib__read_only_data[ ] = {
    __resume_label_0           //final resume point is zero
so that DONE uses a zero convention
```

-continued

```
    __destroy_label_0,         //Done destroy the frame
    __resume_label_1,          // first resume point
    __destroy_label_1,
    __resume_label_2,
    __destroy_label_2,
    __resume_label_3,
    __destroy_label_3
};
// Outlined function using indexed resume points.
```

In the following portion, this code is passed the frame pointer 902 and the hidden parameter for passing back an aggregate by value:

```
void __Fib$resume(UDT * callerSpace, ResumableFrameSlot *
_ptr, Bool using stack) {
    PROLOGUE;
    unsigned int index = * (*ptr+size_t);   // Second word
after the resumable code pointer.
    if (! (index <= compiler_max) ) {
        __Fast_Fail( );
    }
    goto __Fib_read_only_data[index]; // The index is
checked and all resume points are read only.
    __resume_label_0:
//                   <...BODY...>
//  = __yield_value (a + b);
_CoroSave(1)
_CoroSuspend( )
__yield_point_1:
        save_state_into_frame; // saves live registers
callee registers are also
                            // saved in prologue {RBX,
RBP, RDI, RSI, RSP, R12, R13, R14, and R15}
        index = 0;              // Indicate the next
appropriate resume point
        goto Epilogue;
__destroy_label_1:
        __run_dtors_that_are_live up to _yield_point_1;
        goto Done;
__resume_label_1
        restore_state_from_frame; // restore register
lifetimes that span the _yield point.
//                   <...<MORE BODY...>
//   = __yield_value (c + d);
_CoroSave(2)
_CoroSuspend( )
__yield_point_2:
    Save_state_into_frame
    Index = 2;
        goto Epilogue;
__destroy_label_2:
        __run_dtors_that_are_live up to _yield_point_2
        goto Done;
__resume_label_2:
        restore_state_from_frame; // restore register lifetimes
that span the _yield point.
                   <...MORE BODY...>
Done;
    Free_Promise( )        // User defined part of the frame
above the resumable PC
    Free_Coro_Frame( );    // UTC defined part of the frame
below the resumable PC and index
Epilogue:
    Ret
}
```

In some embodiments, in order to make coroutines secure UTC will insert either /Guard indirect call checks 252 or flow attributes through the function and determine that the coroutine can be directly invoked through the exact name of the routine that the back end has outlined for resuming. Indirect call checks 252 determine 332 whether a target of an indirect call is valid. If the target is not valid, control is not passed to the code at the target address. If the target is valid, control is passed to the code at the target address.

In some embodiments, the following process (algorithm) is implemented to determine 302 if a lifetime for a coroutine is local and how to optimize that scenario. This supports both (i) meeting security requirements and (ii) satisfying tight performance goals for iterator-like scenarios. The coroutine lifetime determination algorithm has three steps:

Step 1. Seed points which have a coroutine attribute and a resumable function name.

Step 2. Flow these {pairs} using SSA use-def edges in the tuple stream.

Step 3. Going backwards from the function EXIT do the following:

```
FOR_EACH( "OPINTRINSIC.u64(IV_CORO_RESUME)" call site )
{
    if (the base of the indirection argument has a coroutine attribute and
    resumable function name propagated to it) {
        replace the OPINTRINSIC and the indirection with
            a direct call of "Fib$resume(this, TRUE)"
    }
}
```

The TRUE flag indicates stack elision (i.e., generate 304 code to place coroutine activation frame 226 on the coroutine caller's stack, not on the heap). Elision is an optimization 346 that can be performed as taught herein when the main routine only uses the coroutine within a scope that is local to the caller 202. In addition to using memory more efficiently by stack elision, code generation can be optimized 348 to place the coroutine body inline with the caller.

As an illustration of the coroutine lifetime determination algorithm, consider the following source code:

```
void main( ) {
    for (auto v : fib(35)) {
        printf("%d ", v);
    }
}
```

After the compiler phases processing this source code are complete and code is emitted, the machine code in this example looks like this:

```
main       PROC                            ; COMDAT
$LN72:
           push    rbx
           sub     rsp, 32                 ;
00000020H
; Line 20
           mov     edx, 35                 ;
00000023H
           lea     rcx, QWORD PTR $S2$1[rsp]
```

At this point, RCX has the local address to put the frame ptr in so that main can then use it to resume the coroutine. The function pointer is the first word that the frame pointer points to and it is followed by the integer index of the resume point in that coroutine. Continuing the machine code, this example will now call the allocator for the frame and get back the frame pointer in the local $S2$1 [rsp] which resides on the stack here in main.

```
           call
?fib@@YA?AU?$generator@HV?$allocator@D@experimental@std@@@H@Z ;
fib
           mov     rbx, QWORD PTR $S2$1[rsp]
           test    rbx, rbx
           je      SHORT $LN69@main
```

```
        mov     rcx, rbx
        call    QWORD PTR [rbx] ; resume the coroutine body for the first
time
        mov     rbx, QWORD PTR $S2$1[rsp]
        cmp     QWORD PTR [rbx+8], 0 ; is the index in the coroutine
indicating "done"
        je      SHORT $LN66@main
        test    rbx, rbx
        je      SHORT $LN69@main
        npad    11
$LL33@main:                             ;; label at the top of the for
loop
        mov     rax, QWORD PTR [rbx-16]
        lea     rcx, OFFSET
FLAT:??_C@_03JDANDILB@?$CFd?5?$AA@
        mov     edx, DWORD PTR [rax]
        call    printf
        mov     rcx, rbx
        call    QWORD PTR [rbx]         ; indirect call to resume coroutine
        cmp     QWORD PTR [rbx+8], 0    ; is the index set to zero
        jne     SHORT $LL33@main
```

Without optimization, main would always make an indirect call through [rbx] to resume the coroutine. This is shown above. The instruction "call QWORD PTR [rbx]" is an implementation of the resume and the x64 assembly language is a call through an indirection, namely [rbx]. The register rbx points directly into the middle of the coroutine frame and at that point (by convention) one has the address of "_Fib$_CoroResume," which is the outlined function body of the coroutine. Its internal logic runs off the index which is in the frame slot immediately after the resumable address, namely [rbx+8]. If this index slot is set to zero in the logic of the coroutine body resumed, then that means the coroutine has been resumed for the last time (it expected) and the frame should be freed.

After running an optimization algorithm, one would see all the calls to resume the coroutine as direct calls. The parameter passed to the allocator "call ?fib" is still set to false (by default). This is seen as "mov r8,0".

```
main            PROC                    ; COMDAT
$LN72:
                push    rbx
                sub     rsp, 32         ;
00000020H
; Line 20
; r8 will contain the parameter indicating stack elision, by default this is
zero
indicating FALSE
                mov     r8, 0
                mov     edx, 35         ;
00000023H
                lea     rcx, QWORD PTR $S2$1[rsp]
```

At this point, RCX has the local address to put the frame ptr in so that main can then use it to resume the coroutine. The function pointer is the first word that the frame pointer points to and it is followed by the integer index of the resume point in that coroutine. Continuing the machine code, this example will now call the allocator for the frame and get back the frame pointer in the local $S2$1 [rsp] which resides on the stack here in main. Picking up at the allocator call now, the example code looks like this:

```
        call    ?fib
        mov     rbx, QWORD PTR $S2$1[rsp]
        test    rbx, rbx
        je      SHORT $LN69@main
        mov     rcx, rbx
        call    _fib$_CoroResume ; resume the coroutine body for the
first time
        mov     rbx, QWORD PTR $S2$1[rsp]
        cmp     QWORD PTR [rbx+8], 0 ; is the index in the coroutine
indicating "done"
        je      SHORT $LN66@main
        test    rbx, rbx
        je      SHORT $LN69@main
        npad    11
$LL33@main:                             ;; label at the top of the for
loop
        mov     rax, QWORD PTR [rbx-16]
        lea     rcx, OFFSET
FLAT:??_C@_03JDANDILB@?$CFd?5?$AA@
        mov     edx, DWORD PTR [rax]
        call    printf
        mov     rcx, rbx
        call    _fib$_CoroResume        ; direct call to resume
                                        coroutine
        cmp     QWORD PTR [rbx+8], 0    ; is the index set to zero
        jne     SHORT $LL33@main
```

This optimization eliminates an indirect call in the loop (here the label $LL33@main is at the top of the loop) by turning it into a direct call. That's a benefit but one can have an even larger impact on performance and security. Some examples inline and avoid allocating the stack frame in the heap. At this point, this example will inline and make sure that the variables in the coroutine body (the callee) are added to the stack space allocated for locals in main (the caller).

Once the analysis phase shown above has determined that the life of the coroutine will only span the lifetime of the calling function, it is safe to perform an optimization. This optimization: (a) replaces an indirect call with a direct call, (b) at that new direct call site, inlines the coroutine function body, (c) transforms the caller's body to eliminate the heap allocation of the coroutine frame, (d) transforms the inline body to avoid returns and the register saves and restores around them, and (e) transforms all local variables in the coroutine body (callee) to become new locals in the calling function (caller). The analysis phase will replace all resume intrinsics with the direct calls to the resumable function bodies that the compiler has generated. This replaces an indirect function call with a direct function call.

Once a resume point is turned into a direct call then the compiler can transform that coroutine call site into an inlined function body, in this case the inlined function body of the coroutine. In this example, this involves (a) eliminating all epilogue code, (b) eliminating all instructions emitted to save registers before each yield, (c) eliminating all instructions emitted to restore registers after resuming after each yield point, (d) eliminating the call to library code to allocate the coroutine frame in (a user designated) heap, and (e) eliminating the call to library code to free the coroutine frame in the heap. By doing this the embodiment can then change every local variable in the coroutine (callee) to a local variable added to the stack frame of the calling function (caller).

As to stack elision, in some embodiments the coroutine activation frame 226 itself is not moved from the heap to the stack. Rather, within the compiler the default modeling for code generation which has the frame modeled as resident on the heap 230 is modified (optimized) to model the frame instead as being on the caller's stack. Thus, code to allocate 308 the coroutine frame on the caller stack is generated 304, instead of generating 306 code to allocate 310 the frame on the heap.

In some embodiments, a phase in stack elision takes advantage of the two versions of the call to the ?fib( ) presented above. This example shows the body of the ?Fib ( ) function body as it would appear inside the compiler using its internal representation (IR). When the compiler creates the new body of fib( ) where it outlines an Init( ) and a Resume( ) body the compiler will also conditionalize allocation. Here is an Init function for fib, which sets up the address of the resumable function and the index as shown in the first two lines that contain OPASSIGN:

```
BLOCK 0:V Out(1)
ENTRY      ?fib$__InitCoro (__$S1$~~, _____$ReturnUdt$~~, _n$)
BLOCK 1:V In(0) Out(3,2)
[ $S1$(gr0)]   = OPASSIGN &?fib$ ResumeCoro
[ $S1$(gr0)+4] = OPASSIGN 2(0x2)
tv163(gr0)- = lea         &[__$S1$(gr0)-8]
t138        = OPCMP        tv163(gr0)-, 0(0x0)
              OPBRANCH(EQ) &$LN5, t138!
BLOCK 2:V In(1) Out(3)
t140        = OPARG        4(0x4)
t141        = OPARG        0(0x0)
t142        = OPARG        tv163(gr0)!-
r PAS(7)    = OPINTRINSIC(IV__MEMSET) t142!, t141!, t140!  (4|0=4,4,4)  #15
BLOCK 3:V In(1,2) Out(4)
r$LN5@fib$__InitC:                              ; uses = 1   #15
r t72       = OPINTRINSIC(IV__CORO__FRAME__SIZE) (4|4=N)  #15
r [__$S1$(gr0)+t72!] = OPASSIGN [_n$(gr0)]  (4|4=4,4,4,4) #15
r [_____$ReturnUdt$(gr0)] = OPASSIGN __$S1$(gr0)!  (4|4=4,4) #15
BLOCK 4:V In(3)
EXIT                                            #15
BLOCK
```

Some embodiments use one attribute AAEX_RESUMABLE (or another name) which indicates that a function body is to be handled by the compiler as a coroutine. In some, no other coroutine-specific attributes are used.

For instance, in the FIG. 8 annotated example tuple stream, #1 and the associated arrow indicate discovery of the beginning of the lifetime for a coroutine, namely, for a pointer into the coroutine activation frame. "Seeds" denote locations where type info yields a pointer to the coroutine. In the tuples, t66 denotes a temporary variable; the tuple listing is in SSA (static single assignment) form. The i64 denotes a 64-bit integer type. Thus "t66.i64" denotes a 64-bit integer variable which is being passed as a parameter in a call to Fib( ). In the example tuple stream, #2 and the associated arrows indicate use of this$ in a use-definition analysis, which shows the lifetime of the coroutine Fib( ) extends at least that far. The #3 and associated arrow indicate a Fib( ) resumption point. Code is generated to resume the coroutine and pass the frame pointer to indicate which instruction of the coroutine will be executed upon resuming Fib( ) execution in this instance.

If the first parameter to ?Fib( ) is false then the code allocates a frame in the heap. If the first parameter to ?Fib ( ) is true then code calls _alloca and grows the current stack the size of the frame. This is set up for inlining ?fib back into main( ) the caller. Once code inlines ?fib( ) the stackElision parameter, which is a simple Boolean, will be copy propagated from main into the if statement.

```
BLOCK 0 Out(1)
ENTRY      ?fib (stackElision, _____$ReturnUdt$, _n$)  #6
BLOCK 1:C In(0) Out(2)
```

When inlined one can substitute the caller's value of the stackElision parameter here. One can then eliminate the top half of the if and then the_alloca will take place in the context of the caller. This will be the space used for the coroutine frame:

```
if (! stackElision) {
r t66       = OPINTRINSIC(IV_CORO_FRAME_SIZE)
r t91       = OPADD            t66!, 12(0xc)
r t85       = OPARG            191!
r t87       = OPARG            &___RealAlloc$3
r t89, PAS(7) = OPCALL   &?allocate@?$allocator@D@std@@QAEPADI@Z,
187!, t85!, PAS(7)
r ___Ptr$4     = OPASSIGN t89!
r t170      = OPARG            &__n$
r t169      = OPARG            ____$ReturnUdt$
r t70       = OPADD            ___Ptr$4!, 8(0x8)
r t168      = OPARG            t70!
r PAS(7)    = OPCALL &?fib$_InitCoro, t168!, t169!, t170!, PAS(7)
r           OPRET ____$ReturnUdt$!
else {
r t100      = OPINTRINSIC(IV_CORO_FRAME_SIZE)
r t101      = OPADD            t100!, 12(0xc)
  t102      = OPARG            t101
  t103      = OPINTRINSIC(IV_ALLOCA) t65  //System call to allocate on the
stack
r ___Ptr$4     = OPASSIGN t103
r t104      = OPARG            &__n$
r t105      = OPARG            ____$ReturnUdt$
r t106      = OPADD            ___Ptr$4!, 8(0x8)
r t107      = OPARG            t70!
r PAS(7)    = OPCALL   &?fib$_InitCoro, t107!, t105!, t104!, PAS(7)
r           OPRET ___Ptr$4
}
BLOCK 2 In(1)
EXIT
BLOCK
```

The following code examples provide further illustration. First, the main( ) calling function is shown. It includes in particular the following call:

```
r t65       = OPARG   35 (0x23)    (4|4=4)   #21
r t66       = OPARG   &_$S2$1      (4|4=4)   #21
r t64       = OPARG   0            (4|4=4)   #21
r PAS(10)   = OPCALL  &?fib, t66!, t65!, PAS(10)   (4|0=4,4,4,0) #21
```

This call turns into the code below. The stack frame is now allocated on the stack because of the system call _alloca( ):

```
r t65       = OPARG       35 (0x23)   (4|4=4)   #21
r t66       = OPARG       &_$S2$1     (4|4=4)   #21
r t64       = OPARG       0           (4|4=4)   #21
r PAS(10)= OPCALL         &?fib, t66!, t65!, PAS(10)   (4|0=4,4,4,0) #21
r t100      = OPINTRINSIC(IV_CORO_FRAME_SIZE)
r t101      = OPADD           t100!, 12(0xc)
  t102      = OPARG           t101
  t103      = OPINTRINSIC(IV_ALLOCA) t65   //System call to
allocate on stack
r___Ptr$4     = OPASSIGN t103
r t170      = OPARG           &__n$
r t169      = OPARG           ____$ReturnUdt$
r t70       = OPADD           ___Ptr$4!, 8(0x8)
r t168      = OPARG           t70!
r PAS(7)    = OPCALL     &?fib$_InitCoro, t168!, t169!, t170!,
PAS(7)
  _$S2$1(gr0) = OPASSIGN    ___Ptr$4
```

Here is the main( ) code, before the stack frame is allocated on the stack and the change noted above is made:

```
        BLOCK 0 Out(1)
        ENTRY    _main ( )              #17
        BLOCK 1:C In(0) Out(4,2)
```

This is the call to allocate 48 bytes on the stack. This function is the original Fib that has been outlined into an Fib_Init( )// function and a Fib_Resume( ) function body_$S2$1 is an assembler symbolic constant for indicating a local stack offset So the address &_$S2$1 is simply the rsp+value(_$S2$1). Continuing, one has:

```
r  _count$(gr0) = OPASSIGN 0(0x0)              (4|4=4)    #19
r t65       = OPARG       35 (0x23)  (4|4=4)         #21
r t66       = OPARG       &_$S2$1    (4|4=4)         #21
r t64       = OPARG       0          (4|4=4)         #21
r PAS(10)   = OPCALL    &?fib, t66!, t65!, PAS(10)     (4|0=4,4,4,0) #21
r t94       = OPCMP       _$S2$1(gr0), 0(0x0)    (4|0=4,4) #21
r           OPBRANCH(EQ) &$LN9, t94!                (?|N=0,0) #21
BLOCK 2 In(1) Out(4,3)
r t152      = OPARG       _$S2$1(gr0)           (4|4=4)   #21
r PAS(10)   = OPINTRINSIC(IV_CORO_RESUME) t152!, PAS(10) (4|0=4,0)
#21
r t141      = OPCMP       [_$S2$1(gr0)+4], 0(0x0)     (4|0=4,4,4) #21
r           OPBRANCH(EQ') &$LN79, t141!              (?|N=0,0) #21
BLOCK 3 In(2) Out(10)
BLOCK 4 In(2,1) Out(12,5)
r$LN9@main:                              ; uses = 1   #21
r _<begin>$L0$3(gr0) = OPASSIGN _$S2$1(gr0)       (4|4=4)   #21
r t77       = OPCMP       _$S2$1(gr0), 0(0x0)       (4|0=4,4) #21
r           OPBRANCH(EQ) &$LN67, t77               (?|N=0,0) #21
BLOCK 5 In(4) Out(6)
r tv296(gr0) = lea        &[_$S2$1(gr0)-8]       (4|4=4,4)
r tv302(gr0) = lea        &[_$S2$1(gr0)+4]       (4|4=4,4)
BLOCK 6:L In(5) Out(7)
BLOCK 7:C In(6,7) Out(8,7) Loop:0 Nest:1
r$LL46@main:                             ; uses = 1 #21 [LOOP]
t260        = OPASSIGN [tv296(gr0)]       (4|4=4)   #21
r t81       = OPARG       [t260]                  (4|4=4,4) #22
r t82       = OPARG       &??_C@_04EGBKGGKI@?$CFd?5?6?$AA@ (4|4=4)
#22
r PAS(10)   = OPCALL    &_printf, t82!, t81!, PAS(10)   (4|0=4,4,4,0) #22
_count$(gr0) = add        _count$(gr0), 1(0x1)     (4|4=4,4) #23
r t180      = OPARG       _<begin>$L0$3(gr0)      (4|4=4)   #21
r PAS(10)   = OPINTRINSIC(IV_CORO_RESUME) t180!, PAS(10) (4|0=4,0)
#21
r t174      = OPCMP       [tv302(gr0)], 0(0x0)     (4|0=4,4,4) #21
r           OPBRANCH(NE) &$LL46, t174!              (?|N=0,0) #21
BLOCK 8:S In(7) Out(9)
BLOCK 9 In(8) Out(10)
BLOCK 10 In(3,9) Out(12,11)
$LN79@main:                              ; uses = 1
r t222      = OPCMP _$S2$1(gr0), 0(0x0)           (4|0=4,4) #24
r           OPBRANCH(EQ) &$LN67, t222!              (?|N=0,0) #24
BLOCK 11 In(10) Out(12)
r t233      = OPARG       _$S2$1(gr0)!          (4|4=4)   #24
r           OPINTRINSIC(IV_CORO_DESTROY) t233!       (0|N=4)   #24
BLOCK 12:C In(10,4,11) Out(13)
r$LN67@main:                             ; uses = 2     #24
r t84       = OPARG       _count$(gr0)!  (4|4=4)   #26
r t85       = OPARG       &??_C@_0L@FMCNPOEJ@count?3?5?$CFd?6?$AA@
(4|4=4) #26
r PAS(7)    = OPCALL   &_printf, t85!, t84!, PAS(7)   (4|0=4,4,4,0) #26
            OPRET        0(0x0)              (4|N=4)         #27
BLOCK 13 In(12)
EXIT                                          #27
```

This is an explanation of where _alloca( ) will put space on the stack.

Figure 10:
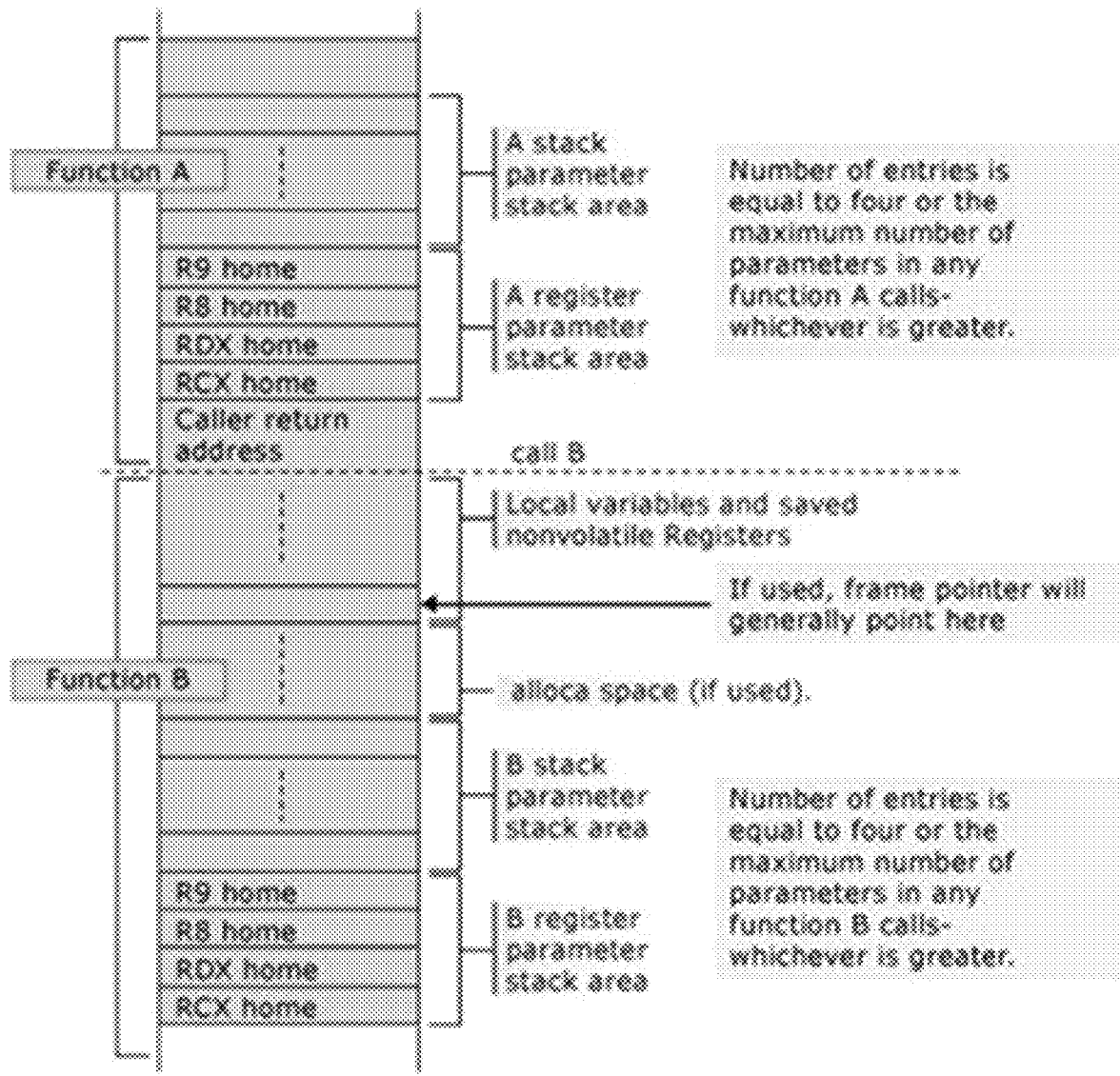
FIG. 10 is a diagram illustrating stack layout.

FIG. 10 shows an example of the stack layout where a function A calls a non-leaf function B. Note the alloca space on the stack. Function A's prolog has already allocated space for all the register and stack parameters required by B at the bottom of the stack. The call pushes the return address and B's prolog allocates space for its local variables, nonvolatile registers, and the space needed for it to call functions. If B uses alloca, the space is allocated between the local variable/ nonvolatile register save area and the parameter stack area.

What remains now is to inline all the direct calls of the Ink) and the Resume( ) function bodies and allocate all their local variables on the new space that has been created on the stack with _alloca( ).

Specifically each call:

```
r PAS(10)        = OPINTRINSIC(IV_CORO_RESUME)
                   t180!, PAS(10)
(4|0=4,0)        #21
```

Will be turned into a direct call
    OPCALL &?fib$_ResumeCoro
This is the example code before inlining:

```
BLOCK 0 Out(1)
ENTRY     _main ( )                          #17
BLOCK 1:C In(0) Out(4,2)
```

In particular, this is the call to allocate 48 bytes on the stack. This function is the original Fib that has been outlined into an Fib_Init( ) function and a Fib_Resume( ) function body.

```
r _count$(gr0) = OPASSIGN 0(0x0)              (4|4=4)  #19
r t100         = OPINTRINSIC(IV_CORO_FRAME_SIZE)
r t101         = OPADD   t100!, 12(0xc)
  t102         = OPARG   t101
  t103         = OPINTRINSIC(IV_ALLOCA) t65  //Sys call to alloc on
                 stack
r _—Ptr$4      = OPASSIGN t103
r t170         = OPARG   &_n$
r t169         = OPARG   ____$ReturnUdt$
r t70  = OPADD   ___Ptr$4!, 8(0x8)
r t168         = OPARG   t70!
r PAS(7)       = OPCALL  &?fib$_InitCoro, t168!, t169!, t170!, PAS
                 (7)
  _$S2$1(gr0)  = OPASSIGN  ___Ptr$4
r t94  = OPCMP   _$S2$1(gr0), 0(0x0)          (4|0=4,4)  #21
r      OPBRANCH(EQ) &$LN9, t94!       (?|N=0,0)  #21
```

```
BLOCK 2 In(1) Out(4,3)
r t152         = OPARG   _$S2$1(gr0)          (4|4=4)  #21
```

In particular, the OPINTRINSIC code in the following line will be different after inlining:

```
r PAS(10)      = OPINTRINSIC(IV_CORO_RESUME) t152!,
                 PAS(10) (4|0=4,0)
#21
```

It will be as follows after inlining:
r PAS(10)=OPCALL &?fib$_ResumeCoro t152, PAS(10)
Continuing with the code that is the same before or after inlining, one has:

```
r t141         = OPCMP   [_$S2$1(gr0)+4], 0(0x0)  (4|0=4,4,4)  #21
r              OPBRANCH(EQ') &$LN79, t141!   (?|N=0,0)  #21
BLOCK 3 In(2) Out(10)
BLOCK 4 In(2,1) Out(12,5)
r$LN9@main:                           ; uses = 1   #21
r _<begin>$L0$3(gr0) = OPASSIGN _$S2$1 (gr0)  (4|4=4)  #21
r t77          = OPCMP   _$S2$1(gr0), 0(0x0)  (4|0=4,4)  #21
r              OPBRANCH(EQ) &$LN67, t77!   (?|N=0,0)  #21
BLOCK 5 In(4) Out(6)
r tv296(gr0) = lea  &[_$S2$1(gr0)-8]   (4|4=4,4)
r tv302(gr0) = lea  &[_$S2$1(gr0)+4]   (4|4=4,4)
BLOCK 6:L In(5) Out(7)
BLOCK 7:C In(6,7) Out(8,7) Loop:0 Nest:1
r$LL46@main:                          ; uses = 1   #21
[LOOP]
  t260         = OPASSIGN [tv296(gr0)]   (4|4=4,4)  #21
r t81          = OPARG   [t260]       (4|4=4,4)  #22
r t82          = OPARG   &??_C@_04EGBKGGKI@?$CFd?5?6?$AA@ (4|4=4)
#22
r PAS(10)      = OPCALL  &_printf, t82!, t81!, PAS(10)  (4|0=4,4,4,0) #22
  _count$(gr0) = add  _count$(gr0), 1(0x1)   (4|4=4,4)  #23
r t180         = OPARG   _<begin>$L0$3(gr0)  (4|4=4)  #21
```

The OPINTRINSIC code in the following line will also be different after inlining:

```
r PAS(10)      = OPINTRINSIC(IV_CORO_RESUME) t180!,
                 PAS(10) (4|0=4,0)
#21
```

It will be as follows after inlining:
PAS(10)=OPCALL &?fib$_ResumeCoro t180!, PAS(10)
Continuing with the code that is the same before or after inlining, one has:

```
r t174         = OPCMP   [tv302(gr0)], 0(0x0)           (4|0=4,4,4)  #21
r              OPBRANCH(NE) &$LL46, t174!               (?|N=0,0)    #21
BLOCK 8:S In(7) Out(9)
BLOCK 9 In(8) Out(10)
BLOCK 10 In(3,9) Out(12,11)
$LN79@main:                           ; uses = 1
r t222         = OPCMP   _$S2$1(gr0), 0(0x0)            (4|0=4,4)    #2All 4
r              OPBRANCH(EQ) &$LN67, t222!               (?|N=0,0)    #24
BLOCK 11 In(10) Out(12)
r t233         = OPARG   _$S2$1(gr0)!          (4|4=4)         #24
r              OPINTRINSIC(IV_CORO_DESTROY)t233!   (0|N=4)            #24
BLOCK 12:C In(10,4,11) Out(13)
r$LN67@main:                          ; uses = 2   #24
r t84          = OPARG   _count$(gr0)!         (4|4=4)   #26
r t85          = OPARG&??_C@_0L@FMCNPOEJ@count?3?5?$CFd?6?$AA@
(4|4=4) #26
r PAS(7)       = OPCALL&_printf, t85!, t84!, PAS(7)  (4|0=4,4,4,0) #26
               OPRET  0(0x0)         (4|N=4)           #27
BLOCK 13 In(12)
EXIT                                  #27
```

Now one inlines both calls to the compiler generated functions that were outlined from the original ?fib( ) function:

```
OPCALL ?fib$ ResumeCoro
OPCALL ?fib$ InitCoro
```

All the local variables that are used in these functions will now play off the stack. Additionally, because everything is exposed; namely the index that's in the stack frame and the OPSWITCH that uses that, one can eliminate the OPSWITCH that would be inlined from each call to &?fib$_ResumeCoro.

In some embodiments, the coroutine frame layout in memory has the following portions and aspects in the stated order: a promise portion (used by library) 236, a padding portion (16 bytes on x64, 8 bytes on x86), a coroutine frame pointer target address at the inside edge of the padded promise (stored in RBP register on x64, EBX register on x86), a resume-prolog portion (initialized and used by the library but the BE reserves the slot), a non-volatile register save area portion 244 used by the BE, a resume IP portion used by the BE, an EH trylevel portion used by the BE (x86 only), a BA_DYNAMIC variables portion used by the BE. Resume code can look something like this:

```
48 8B    C1    mov rax,rcx
48 8B    D1    mov rdx,rcx
33 C9          xor ecx,ecx
FF 10          call qword ptr [rax]
```

In some embodiments, the coroutine frame layout in memory has the following portions in the stated order: coroutine promise 236, resume prolog address 240, resume index 242, platform-specific register/save area 244, local variables and temporaries spill area 238. Some embodiments omit promises 236. Some omit the spill area 238. In some, the resume index provides an offset from the resume prolog address or other indication to specify which resumption point 222 of the coroutine will receive processor control upon resumption of coroutine execution.

In some concurrent programming languages, a "promise" is a construct used for synchronization. In some, a "future" is a read-only placeholder view of a variable, while a promise is a writable, single assignment container which sets the value of the future. Some embodiments omit the promise portion from the coroutine frame.

In some embodiments, frame 226 layout conforms with the following. There is only one entry point to any resumable coroutine. There is either a valid integer in the index or execution will hit an int 3. A frame_ptr 902 points to a location within the frame containing _ResumeFptr( ), which is followed by the resumption point index 242. After this pair (entry point address and index), the frame contains registers and target ABI-specific data. More security from optimizing this case comes from doing "heap elision" (i.e., allocating on the local stack of the caller) and then doing a direct call to the resumable code 224. One can also guard the indirect call for the resumable body which is simply a call back from the operating system.

Some embodiments perform or provide an optimization 346 which transforms the code from resuming a coroutine through an indirect function pointer (stored in a frame allocated from the heap) to directly calling a coroutine body "by name" and allocating 308 its frame on the local stack. "Local" in this example is the same local as in "local variable", namely, on the stack 228 of the caller 202 of the coroutine instance. Heap allocations are expensive and optimizations which can avoid them and substitute stack memory of the caller can lead to significant performance savings.

In some embodiments, in code that would call a "resumable function" the coroutine is represented as a basic handle to a frame structure in the heap. The first word pointed to contains the address 240 of a resumable function body. The second word (an index) 242 points to (or holds) an ordinal which represents a particular point (1 of N) in the resumable function body where execution is to resume. Given the frame 226 in the heap, and an ordinal representing a resume point, a caller can invoke a coroutine in ways that allow the compiler to affect an asynchronous programming model. Some embodiments support replacing the .then( ) construct that is responsible for about 5K bytes in the .text section per instance with a coroutine frame that is typically about 48 bytes. This is a significant memory savings.

In some embodiments, the coroutine frame pointer 902 points (by convention) somewhere in the middle of the frame. It points right at the slot 240 that contains the resumable function pointer. The Promise class has a default implementation that can be customizable by library writers if they adhere to an API which is described as a part of the front end and STL library documentation. Back in the caller, resuming 344 a coroutine on x86 is an indirect call through the frame pointer which passes the frame_ptr as a this pointer. The resumable code loads the index and executes a switch to the correct resume point. Upon yielding, the code generation out of the front end will cause UTC to emit code to increment the index appropriately if there is another resume point.

The following two columns illustrate the C++ key word, and then the CIL that one front end 130 would generate:

| __yield_value <expr> | __await <expr> |
|---|---|
| promise.yield_value(expr)<br>IV_CORO_SAVE(yield_point_n)<br>IV_CORO_SUSPEND(yield_point_n) | tmp = expr<br>if (! tmp.await_ready( )) {<br>    IV_CORO_SAVE( );<br>    // The resumable funclet can be resumed by another<br>    // thread before the await_suspend returns (without locks)<br>    tmp.await_suspend(_resumable_frame_ptr( ));<br>        IV_CORO_SUSPEND( );<br>}<br>tmp.await_resume( ) |

The front end binds to a backend code generation through compiler intrinsics 144. In some implementations, these include one or more of the intrinsics shown herein, and/or in a library though construction of the classes that have a defined API in STL extensions.

As a lifespan example, in this code:
for (auto v: fib(35)) printf("%d\n", v);
a coroutine is created and destroyed and does not survive beyond the semicolon.

But in this example:

```
{
    auto f = fib(35);
    DoSomething(f);
} // scope-ends
```

DoSomething takes the coroutine by reference. DoSomething might have stashed the coroutine in some global variable or in some heap block that will keep it alive beyond curly brace with a comment "scope-ends." Thus we cannot do heap elision in this example, because the address potentially escapes the local call.

Some embodiments include code which upon execution by a processor in a system having a memory in operable communication with the processor will perform one or more of the following methods.

In some, a compiler 128 generates code to allocate an activation frame, generates code to set a resumption address in the frame, and generates code to set a resumption index in the frame. For instance, a method for implementing a stackless resumable function includes: a compiler generating code which upon execution allocates a resumable function activation frame from a memory in a computing system; the compiler also generating code which upon execution places a resumption address in the activation frame, the resumption address being the address of a resumable portion of a function body; and the compiler also generating code which upon execution sets a resumption index in the activation frame, the resumption index being an ordinal whose value distinguishes between a plurality of execution resumption points in the function body.

In some cases, the activation frame 226 includes a promise section. One method includes the compiler also generating code which upon execution initializes a promise data structure in the activation frame.

In some cases, the resumable function body is compiled 402 in two pieces. One piece is an init section that will execute prior to the first suspend point. The other piece is a resume section that will execute after any suspend ends. In one method, the compiler compiles the function body in at least a first piece and a second piece, the pieces being delimited by an initial suspension point of the function body, the first piece including an initialization portion of the function body which executes up to the initial suspension point, the second piece including a resumption portion that executes after any suspension point of the function body.

In this example, the compiler front end does language-specific parsing and produces a syntax tree and symbol table. The compiler back end converts these into tuples 248. For the resumable function, the front end tells the back end (a) the init point, (b) each suspend point, and (c) each resume point. In one method, the compiler includes a front end and a back end, the front end performs lexical analysis and parsing for a particular programming language, the back end converts output from the front end into tuples which include machine-independent opcodes and symbolic operands, and the front end identifies the following to the back end: (a) an initialization point of the resumable function, (b) each suspend point of the resumable function, (c) a resume point for each suspend point, indicating where execution will resume after that suspend. In one such method, the front end identifies 326 resumable function init, suspend, and resume points to the back end using intrinsics.

Sometimes the compiler checks whether the activation frame can be placed in the caller's stack instead of in the heap. In one method, the compiler also determines whether the resumable function has a lifespan that will not extend beyond a call to the resumable function made by a caller, and when the compiler determines that the resumable function lifespan will not extend beyond the call, the compiler generates code which upon execution will allocate the activation frame from a local stack memory of the caller, and when the compiler determines that the resumable function lifespan can extend beyond the call, the compiler generates code which upon execution will allocate the activation frame from a heap memory. In some such methods, the compiler determines an extent of the resumable function lifespan at least in part by using 316 a static single assignment use-definition chain.

The yield and await examples are non-limiting. Teachings herein are not limited to the specific keyword defining that functionality in a given programming language, or to that specific functionality as a use of coroutines which can be optimized by stack elision.

Sometimes the compiler will add security 252 to prevent exploiting the resumable function activation frame. In one method, the compiler also generates code which upon execution verifies that an address specified by the resumable function activation frame is a valid address before passing control to that address.

In one implementation, the backend first does transformations for machine independent optimization that can be summarized as (i) outline parts of the coroutine function body, (ii) create machine independent control flow with a switch, hide details with intrinsics. For example, the body of foo will be ripped into three parts as shown below:

```
generator foo( ) {
    __yield_value 1;
    __yield_value 2;
}
```

```
foo$ ( ) {              foo$__CoroInit( )           foo$__CoroResume(int
Customizable            {                           resume__pt)
library code                Customizable library    {
    foo$init( )         code                            Switch(resume__pt)
}                           If (!                       {
                        promise.initial__suspend( ))        case 0:
                                foo$resume((0))             case 1:
                        }                                   case 2:
                                                            case 3:
                                                            case 4:
                                                            case 5:
                                                            default:
                                                        debug__break( );
                                                        }
```

As to code generation, consider compilation 402 of either of these functions. As part of customization machinery in some examples, a library writer is allowed to choose whether they want to have an initial suspend and final suspend, which are introduced by a compiler rather than being written by the user.

```
#include <generator> //         #include <resumable>
STD::Experimental              //STD:Experimental
generator foo( ) {             task<void> foo( ) {
    ___yield_value 1;              ___await sleep_for(1000ms);
    ___yield_value 2;              printf("%x: await is over!\n",
}                              GetCurrentThreadId( ));
                               }
```

There are five phases in UTC that take care of lowering this function, in this example.

Phase 1. Implemented, e.g., by boolean CoroutineOutlineTransform (PFUNC func). This will outline both the _Init( ) and the _Resume( ) functions. The _Init( ) will allocate and setup the frame structure 226. The original function will become a small shell that will call the _Init( ). This phase suspends compilation of the original function and puts all three routines on the compiler's worklist. Dependency edges will be created so that the _Resume( ) is compiled first.

Phase 2. Implemented, e.g., by void CoroutineProcessResume (PFUNC func). Insert a pair of labels at each _yield and collect them for a 0-n ordering on the OPSWITCH statement. Odd numbers will be the code to run destructors and cancel. Even numbers will be the code to run, when resuming at this point. While doing this, turn the SUSPEND into a GOTO cancel and at each save store an index back to the frame. Finish all the code generation for the resume function which works around the switch statement. Insert code at the end of each destroy label that jumps to the Cancel code sequence. The sequence will tear down the Promise part of the frame and the UTC specific part of the frame. Create this code sequence at the end of the resume( ) body. Insert a call to debug break after the default label. Insert a "done" label after the debug break in the default which should be right before the epilogue.

Phase 2. Implemented, e.g., by Lower( ). In this implementation of coroutine, the frontend will generate intrinsics for operations shown in its syntax trees. A C2 reader turns these into the following backend intrinsics 144:

1. OPINTRINSIC(IV_RESUMABLE_RESUME_ADDR)
2. OPINTRINSIC(IV_RESUMABLE_FRAME_SIZE)
3. OPINTRINSIC(IV_RESUMABLE_INIT_FRAME)
4. OPINTRINSIC(IV_RESUMABLE_DESTROY_FORMALS)
5. OPINTRINSIC(IV_RESUMABLE_FRAME_PTR)
6. OPINTRINSIC(IV_RESUMABLE_SAVE)
7. OPINTRINSIC(IV_RESUMABLE_SUSPEND)

Phase 4. Implemented, e.g., by CoroMdRestoreAndSave (PFUNC func). In a coroutinemd.cpp file, this inserts the save and restore code for all callee-saves registers. The restore code fires once before the switch. The appropriate save code fires at each place the function is suspended.

Phase 5. Implemented, e.g., by CoroMdInsertFinalMovs ( ). Cleanup.

As to compiler scheduling, in one implementation the compilation order will be: _Resume( ), _Init( ) and then the original function( ).

In some embodiments, the function that is compiled 402 as a coroutine has code generation that creates a frame 226 (sometimes in the heap) so the function can be halted and resumed infinitely (that is, an arbitrarily large number of times). In order to make some scenarios faster and more secure some compiler embodiments perform an analysis and optimization 346, 348, which results in the frame being moved to the local stack and the generator coroutine body being inlined in the caller.

Some embodiments use different intrinsics 144. One implementation provides the following instrinsics:
OPINTRINSIC(IV_RESUMABLE_RESUME_ADDR)
OPINTRINSIC(IV_RESUMABLE_FRAME_SIZE)
OPINTRINSIC(IV_RESUMABLE_INIT_FRAME)
OPINTRINSIC(IV_RESUMABLE_DESTROY_FORMALS)
OPINTRINSIC(IV_RESUMABLE_FRAME_PTR)
OPINTRINSIC(IV_RESUMABLE_SAVE)
OPINTRINSIC(IV_RESUMABLE_SUSPEND)
OPINTRINSIC(IV_RESUMABLE_CANCEL)

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Presence of some implementations can be detected by creating a program with coroutines that satisfy the criteria for an activation frame 226 on the caller stack 228 instead of in the heap 230, then stepping through code 138 with a debugger 134 and seeing whether the frame is put on the heap (conventional expensive approach) or on the caller stack (innovation) by the compiler-generated code. This innovation could be presented to app developers as part of compilation options, or could operate entirely under the hood as a compiler optimization. It could be implemented in a single device or across multiple devices.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the technical effects and operation of systems and manufactures like those discussed. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item discussed in the text or shown in the Figures need be present in every embodiment. Conversely, an embodiment may contain item(s) not discussed expressly in a particular example or shown in a given Figure. Although some possibilities are illustrated here in text and diagrams by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method for implementing a resumable function, comprising:
    a compiler determining at compile time whether the resumable function has a lifespan that will not extend beyond a call to the resumable function made by a caller in a computing system;
    when the compiler determines that the resumable function lifespan will not extend beyond the call, the compiler generating code which upon execution will allocate an activation frame of the resumable function from a local stack memory of the caller in the computing system; and
    when the compiler determines that the resumable function lifespan can extend beyond the call, the compiler generating code which upon execution will allocate the activation frame from a heap memory in the computing system.

2. The method of claim 1, further comprising the compiler generating code which upon execution places a resumption address in the activation frame, the resumption address being the address of a resumable portion of a function body of the resumable function.

3. The method of claim 1, further comprising the compiler generating code which upon execution sets a resumption index in the activation frame, the resumption index being an ordinal whose value distinguishes between a plurality of execution resumption points in a function body of the resumable function.

4. The method of claim 1, wherein the compiler determines an extent of the resumable function lifespan at least in part by using a static single assignment use-definition chain.

5. The method of claim 1, wherein the resumable function includes at least one of the following: a yield statement, an await expression.

6. The method of claim 1, wherein the compiler also inlines code of the resumable function in the caller of the resumable function.

7. The method of claim 1, wherein the compiler also generates code which upon execution initializes a promise data structure in the activation frame.

8. The method of claim 1, wherein the compiler includes a front end and a back end, the front end performs lexical analysis and parsing for a particular programming language, the back end converts output from the front end into tuples which include machine-independent opcodes and symbolic operands, and the front end identifies the following to the back end: (a) an initialization point of the resumable function, (b) at least one suspension point of the resumable function, (c) a resumption point for each suspension point, indicating where execution of the resumable function will resume after execution has been suspended at that suspension point.

9. The method of claim 8, wherein the compiler front end identifies resumable function initialization, suspension, and resumption points to the compiler back end using intrinsics.

10. A computer-readable storage medium configured with data and with instructions that upon execution by at least one processor in a compilation computing system will cause the at least one processor to perform a technical process for coroutine compilation, the process comprising:
    determining at compile time whether a coroutine has a lifespan that will not extend beyond a call to the coroutine that will be made by a caller in a target computing system;
    when the coroutine lifespan will not extend beyond the call, generating code which upon execution by a processor in the target computing system allocates an activation frame of the coroutine from a local stack memory of the caller in the target computing system;
    when the coroutine lifespan can extend beyond the call, generating code which upon execution in the target computing system allocates the activation frame from a heap memory in the target computing system; and
    generating code which upon execution in the target computing system places a resumption address in the activation frame, the resumption address being the address of a resumable portion of the coroutine.

11. The computer-readable storage medium of claim 10, wherein the process further comprises generating code which upon execution in the target computing system initializes a promise data structure in the activation frame.

12. The computer-readable storage medium of claim 10, wherein the process further comprises at least one of the following:
generating code which upon execution in the target computing system verifies that a resumption address value specified in the activation frame is a valid value before passing control based on that resumption address value;
generating code which upon execution in the target computing system verifies that a resumption index value specified in the activation frame is a valid value before passing control based on that resumption index value.

13. The computer-readable storage medium of claim 10, wherein the process determines an extent of the coroutine lifespan at least in part by using a static single assignment use-definition chain.

14. A computer system comprising:
a compilation processor;
a memory in operable communication with the compilation processor;
program source code residing in the memory, the program source code including a call to a coroutine by a caller;
a static single assignment use-definition chain residing in the memory and based on a definition of the coroutine in the program source code and also based on at least one use of the coroutine in the program source code;
a compiler residing in the memory and having coroutine compilation code, the coroutine compilation code interacting with the compilation processor and memory to perform, upon execution, a process which includes (a) determining with an analysis of the static single assignment use-definition chain whether the coroutine has a lifespan that will not extend beyond the call when the call is executed by a target processor, (b) when the coroutine lifespan will not extend beyond the call, the compilation processor generating code which upon execution by the target processor allocates an activation frame of the coroutine from a local stack memory of the caller, and (c) when the coroutine lifespan can extend beyond the call, the compilation processor generating code which upon execution by the target processor allocates the activation frame from a heap memory.

15. The system of claim 14, wherein the activation frame comprises a resumption index, namely, an ordinal whose value distinguishes between a plurality of execution resumption points in the coroutine.

16. The system of claim 14, wherein the activation frame comprises a promise portion which the target processor initialized in executing the code compiled from the program source code, and a platform-specific register save area initialized by a runtime.

17. The system of claim 14, further comprising at least a first coroutine piece and a second coroutine piece residing in the memory, the coroutine pieces delimited by an initial suspension point of the coroutine, the first coroutine piece including an initialization portion of the coroutine which the target processor executes up to the initial suspension point, the second coroutine piece including a resumption portion that the target processor executes after at least one suspension point of the coroutine.

18. The system of claim 14, wherein the coroutine compilation code identifies coroutine initialization, suspension, and resumption points using intrinsics in an intermediate language produced from the program source code.

19. The system of claim 14, further comprising compiled coroutine code which upon execution by one or more target processors allocates the activation frame of the coroutine from a local stack memory of the caller and executes at least a portion of the coroutine inline with the caller of the coroutine.

20. The system of claim 14, wherein the coroutine includes at least one of the following: a yield statement, an await expression.

* * * * *